Nov. 19, 1940.  H. RAUH  2,222,373
CALCULATING MACHINE
Filed Sept. 17, 1934  13 Sheets-Sheet 1

Inventor:
Hermann Rauh
By Emil Bonnelycke
Attorney

Nov. 19, 1940.   H. RAUH   2,222,373
CALCULATING MACHINE
Filed Sept. 17, 1934   13 Sheets-Sheet 2
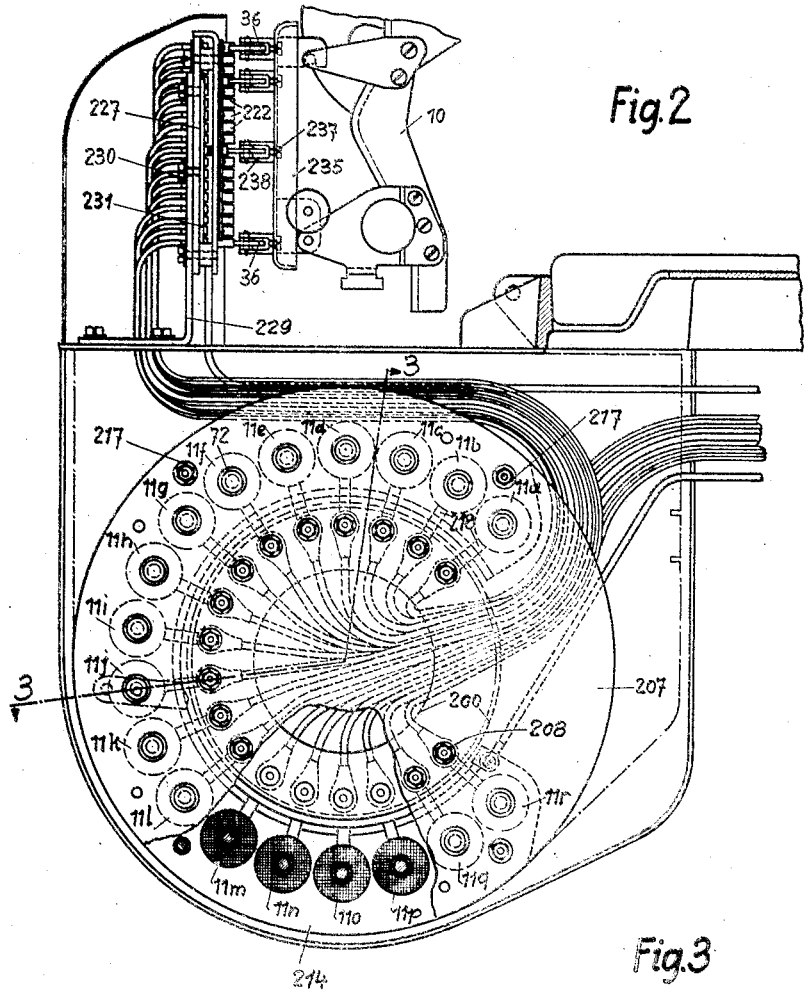
Fig. 2
Fig. 3
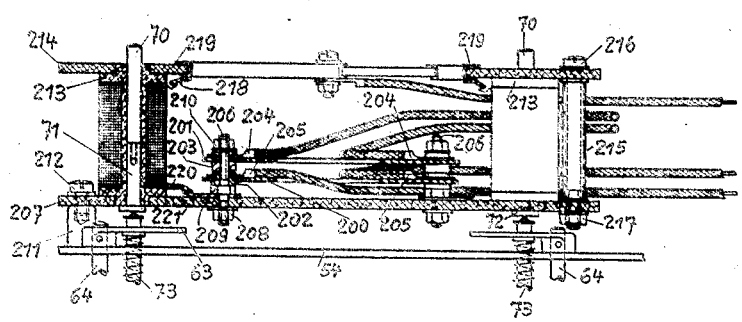
Inventor:
Hermann Rauh
By Emil Bonnelycke
Attorney Nov. 19, 1940.   H. RAUH   2,222,373
CALCULATING MACHINE
Filed Sept. 17, 1934   13 Sheets-Sheet 4

Inventor:
Hermann Rauh
By Emil Bömelyche
Attorney

Nov. 19, 1940.  H. RAUH  2,222,373
CALCULATING MACHINE
Filed Sept. 17, 1934   13 Sheets-Sheet 6

Inventor:
Hermann Rauh
By Emil Bonnelycke
Attorney

Nov. 19, 1940.   H. RAUH   2,222,373
CALCULATING MACHINE
Filed Sept. 17, 1934   13 Sheets-Sheet 7
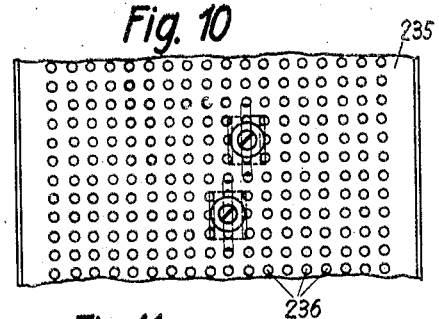
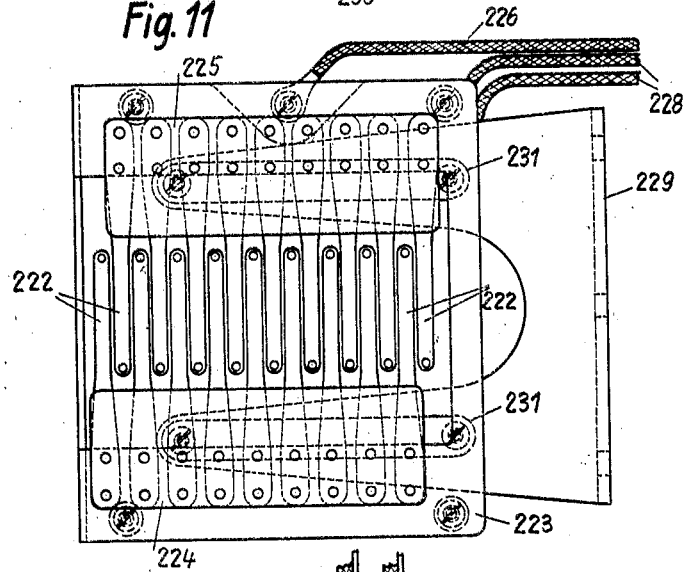
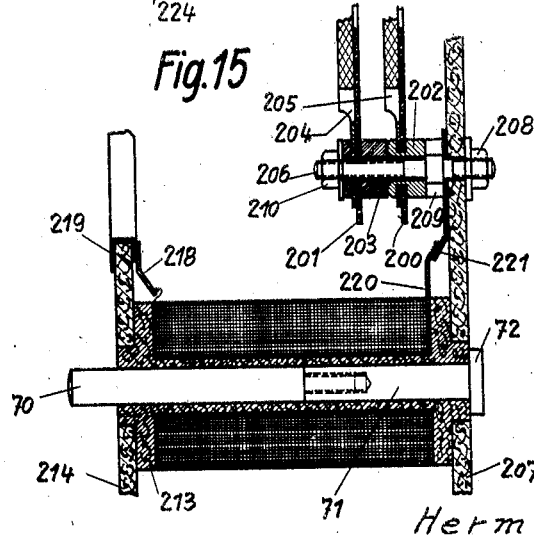
Inventor:
Hermann Rauh
By Emil Brönclyche
Attorney Nov. 19, 1940.  H. RAUH  2,222,373
CALCULATING MACHINE
Filed Sept. 17, 1934   13 Sheets-Sheet 8
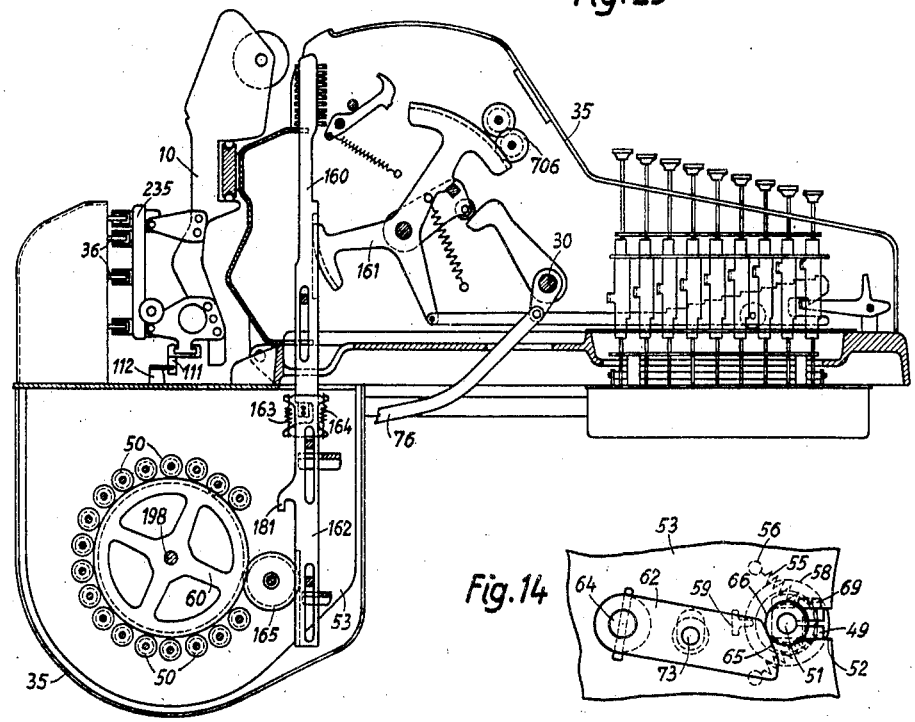
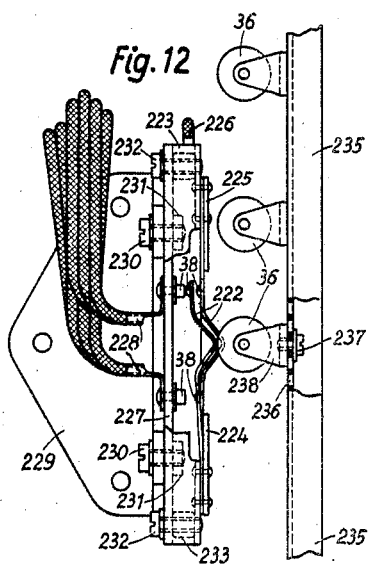
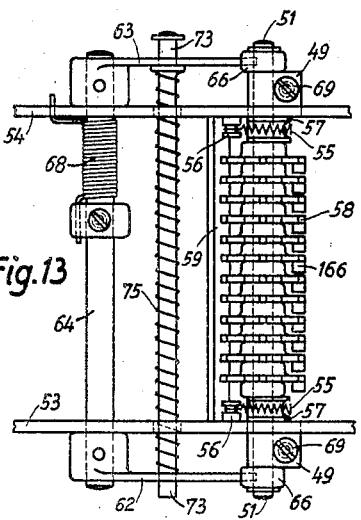
Inventor:
Hermann Rauh
By Emil Bonnelycke
Attorney Nov. 19, 1940.  H. RAUH  2,222,373
CALCULATING MACHINE
Filed Sept. 17, 1934   13 Sheets-Sheet 9
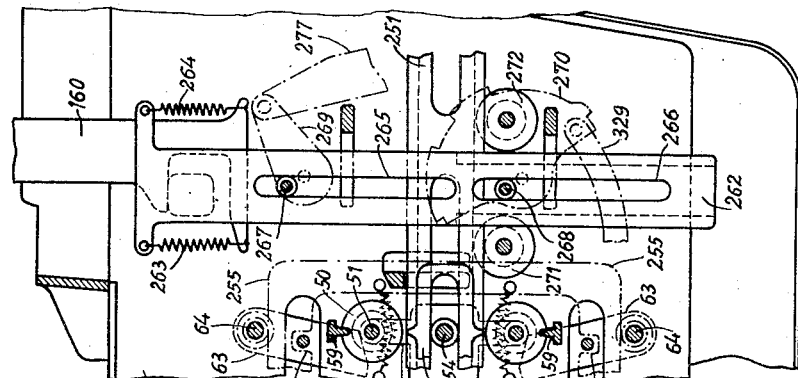
Fig. 16
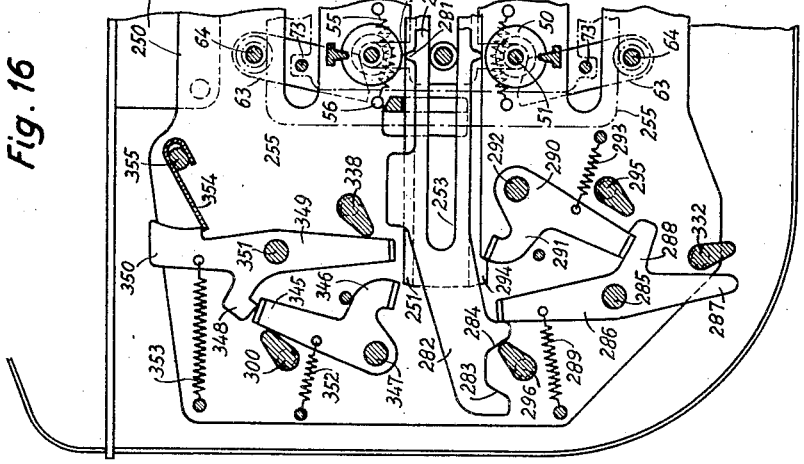
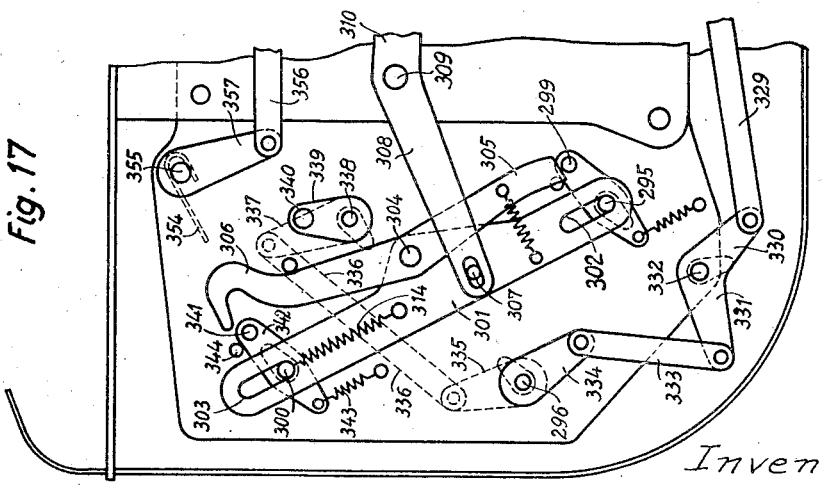
Fig. 17
Inventor
Hermann Rauh
By Emil Bömelyche
Attorney Nov. 19, 1940.    H. RAUH    2,222,373
CALCULATING MACHINE
Filed Sept. 17, 1934    13 Sheets-Sheet 10

Inventor:
Hermann Rauh
By Emil Bönnelycke
Attorney

Nov. 19, 1940.  H. RAUH  2,222,373
CALCULATING MACHINE
Filed Sept. 17, 1934   13 Sheets-Sheet 11

Inventor:
Hermann Rauh
By Emil Bönnelycke
Attorney

Nov. 19, 1940.  H. RAUH  2,222,373
CALCULATING MACHINE
Filed Sept. 17, 1934  13 Sheets-Sheet 12

Inventor:
Hermann Rauh
By Emil Bonnelycke
Attorney

Nov. 19, 1940.    H. RAUH    2,222,373
CALCULATING MACHINE
Filed Sept. 17, 1934    13 Sheets-Sheet 13

Inventor:
Hermann Rauh
By Emil Bönnelycke
Attorney

Patented Nov. 19, 1940

2,222,373

UNITED STATES PATENT OFFICE 2,222,373

CALCULATING MACHINE

Hermann Rauh, Berlin-Zehlendorf, Germany, assignor to Wanderer-Werke vorm. Winklhofer & Jaenicke Akt.-Ges., Schonau, near Chemnitz, Germany Application September 17, 1934, Serial No. 744,441
In Germany September 18, 1933

7 Claims. (Cl. 235—60)

The invention relates to a calculating machine with a plurality of accumulators and has for its object to render these accumulators available in the most general and diverse manners. In particular, the accumulators can be rendered operative in a definite column both automatically and manually, singly or in groups, and in any desired sequence. Further, when a desired accumulator has been selected by the operation of manual setting means, any accumulator which has been rendered operative by paper carriage movement is automatically rendered inoperative.

Figure 1:
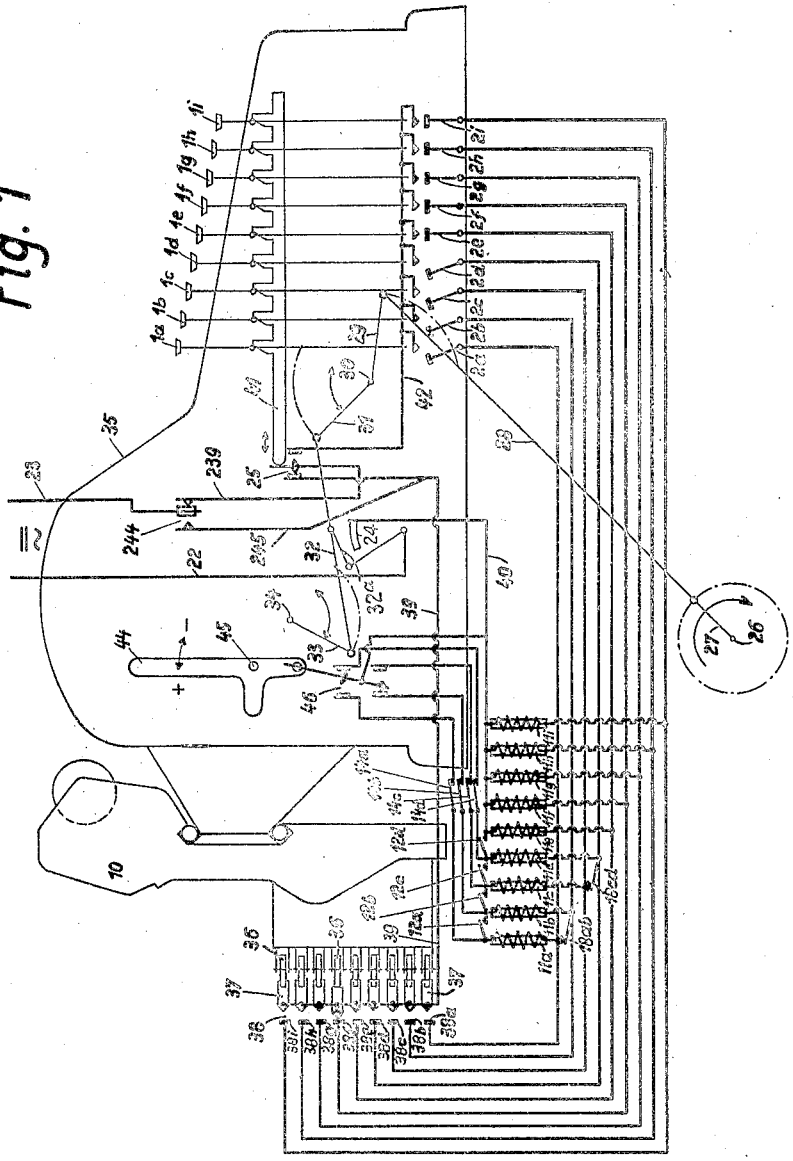
Figure 4:
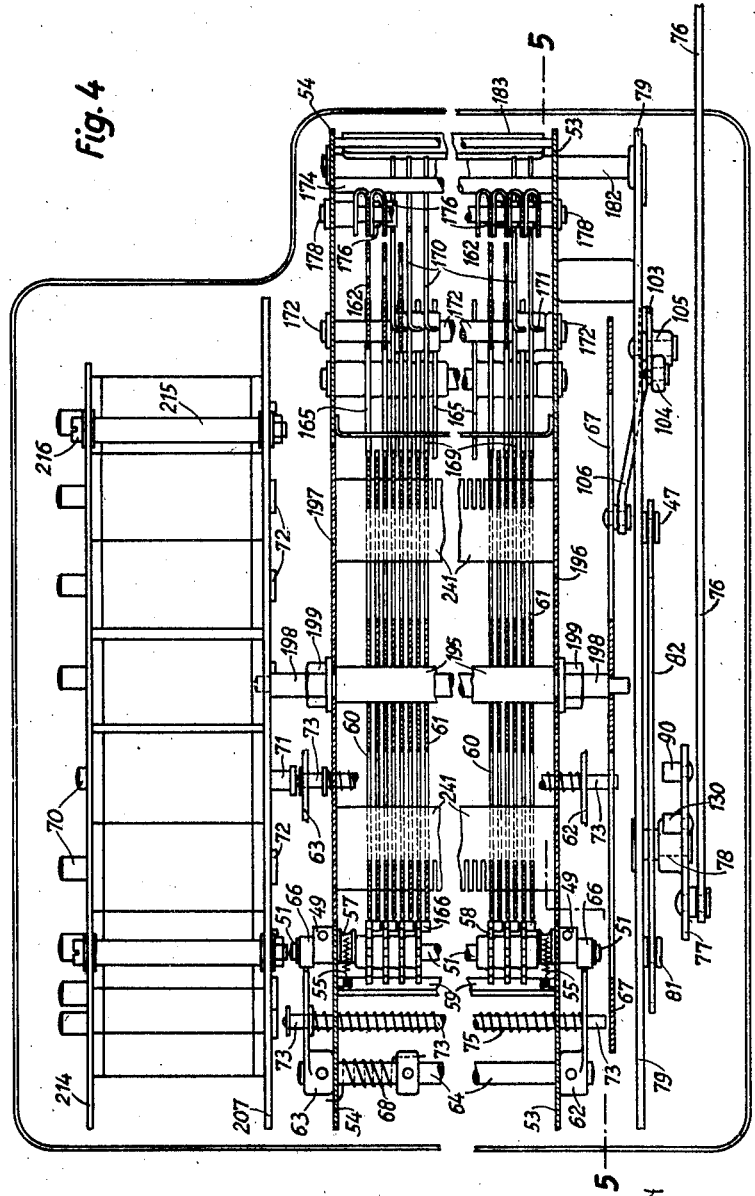
Figure 5:
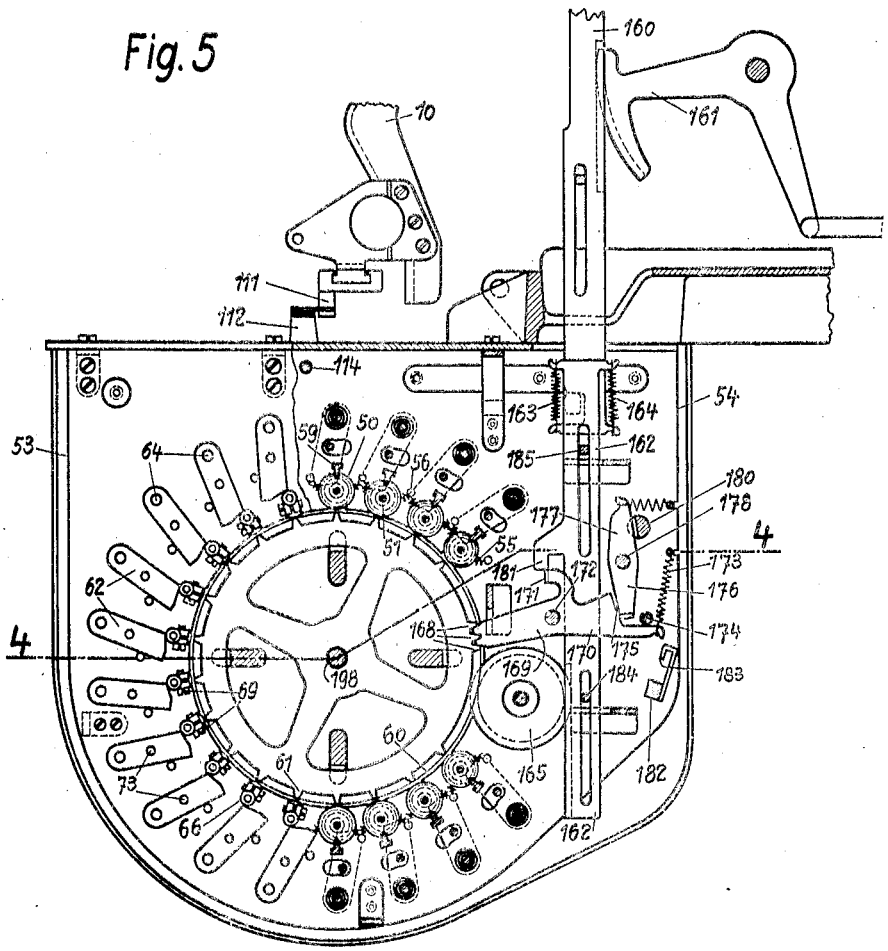
Figure 6:
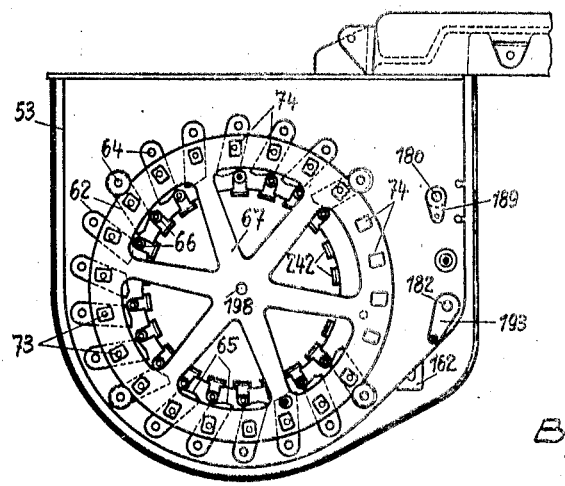
Figure 7:
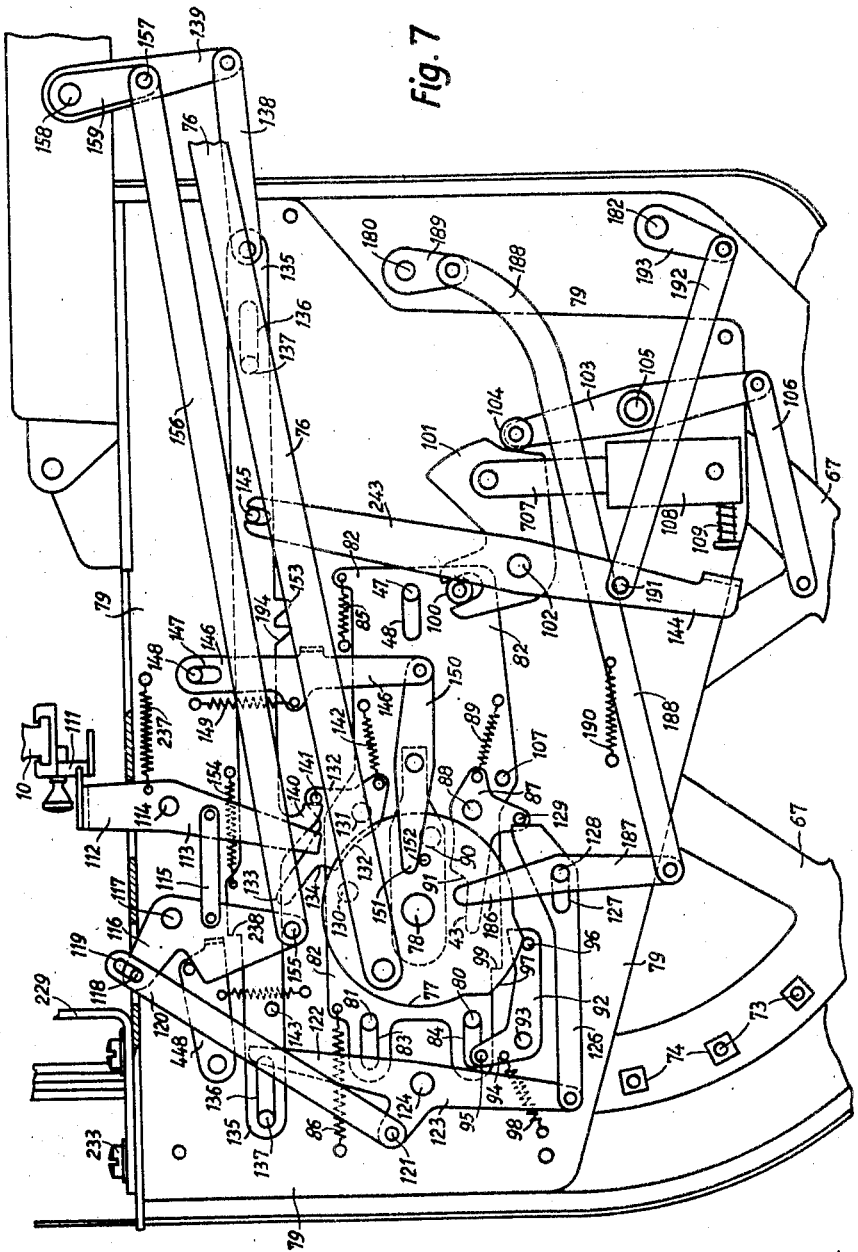
Figure 8:
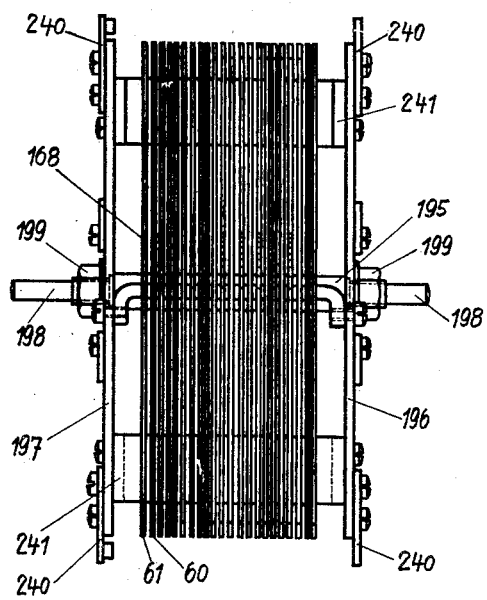
Figure 9:
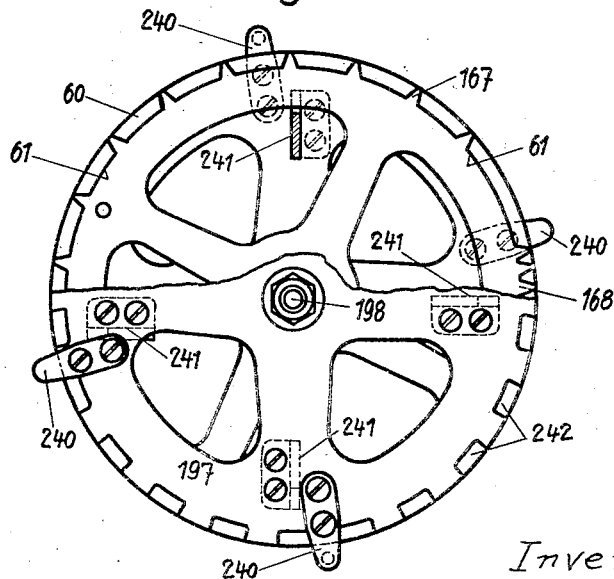
Figure 18:
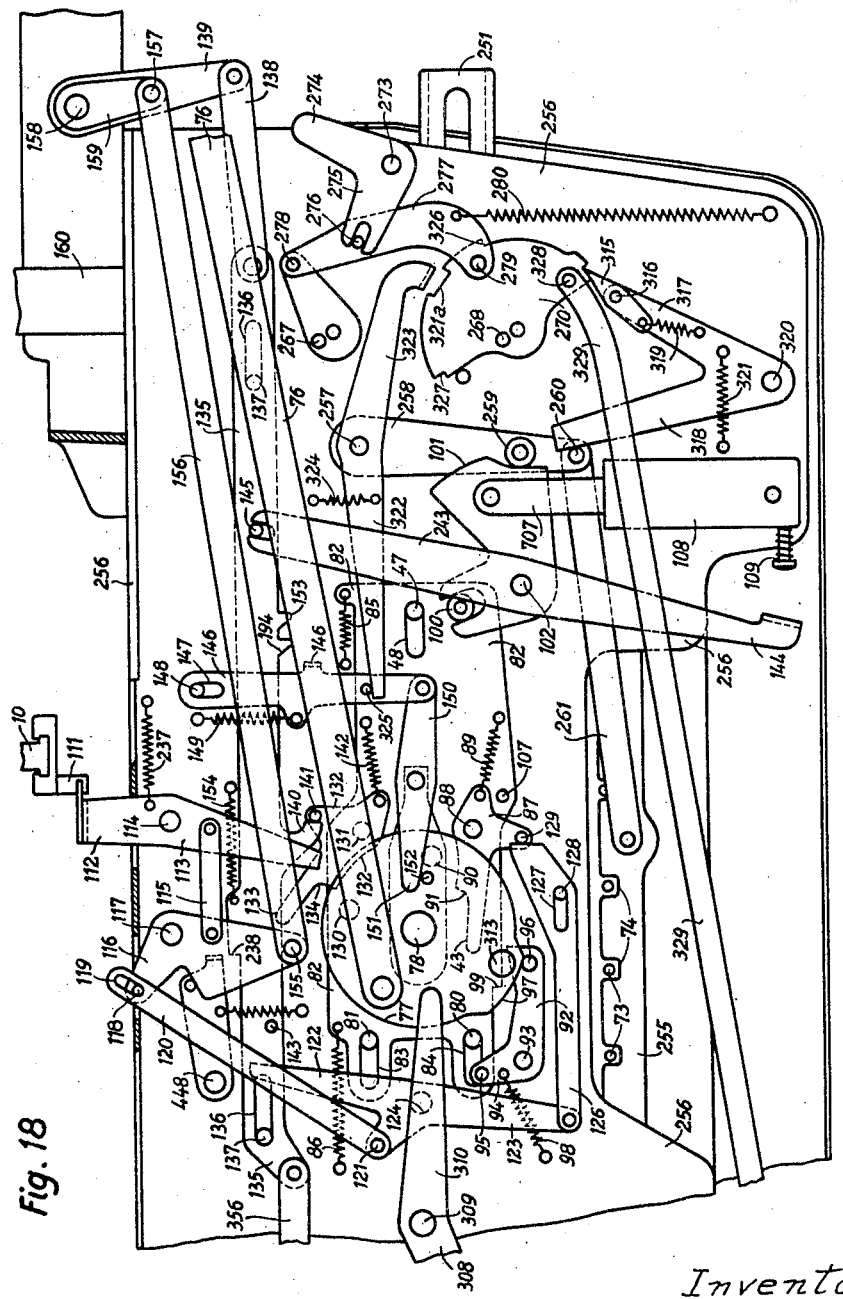
Figure 19:
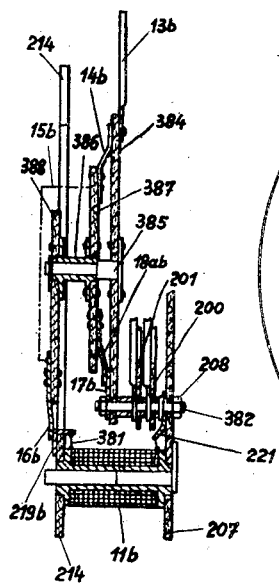
Figure 20:
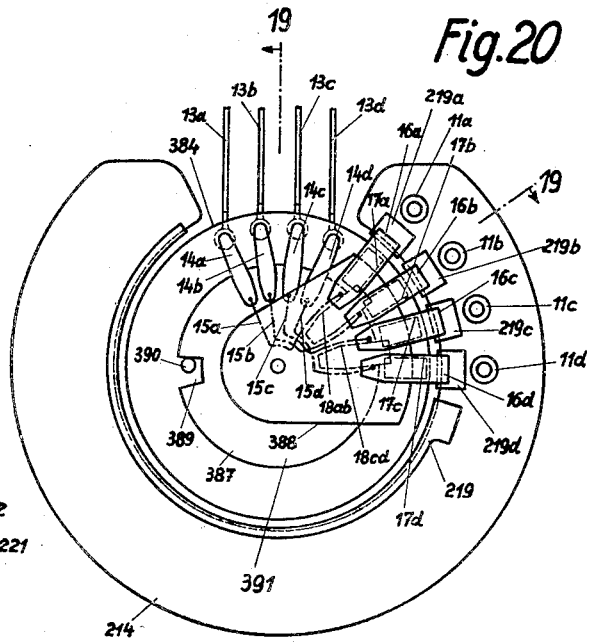
Figure 21:
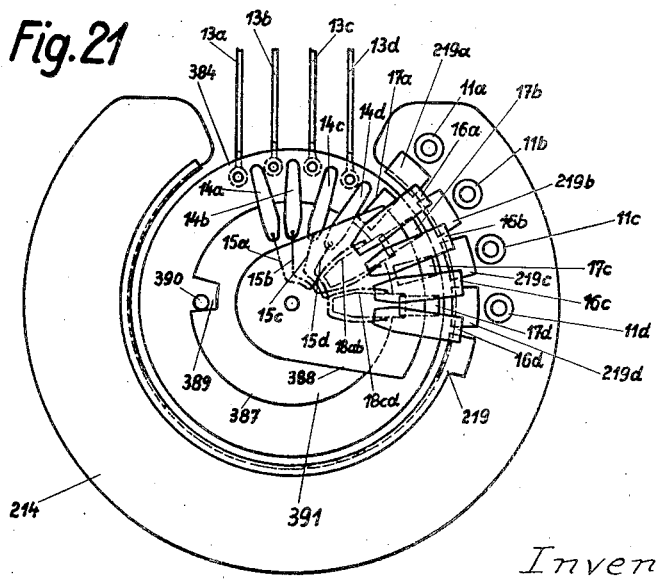
Figure 20A:
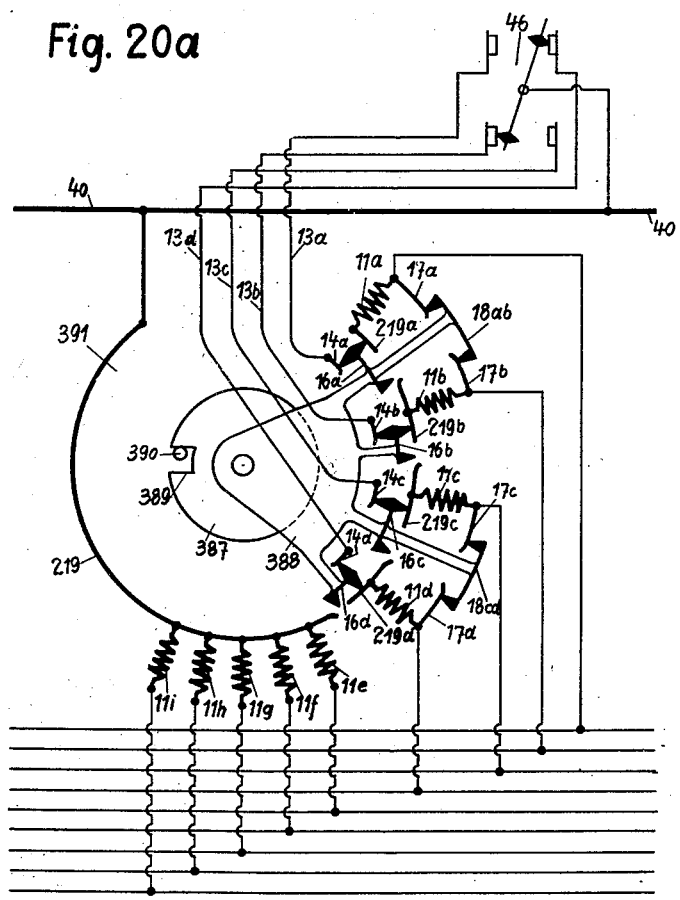
Figure 21A:
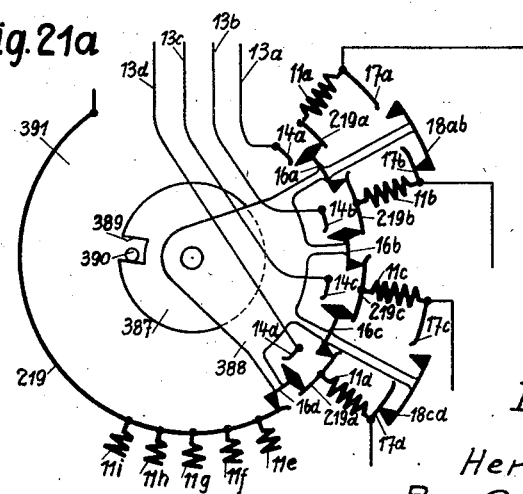
Figure 22:
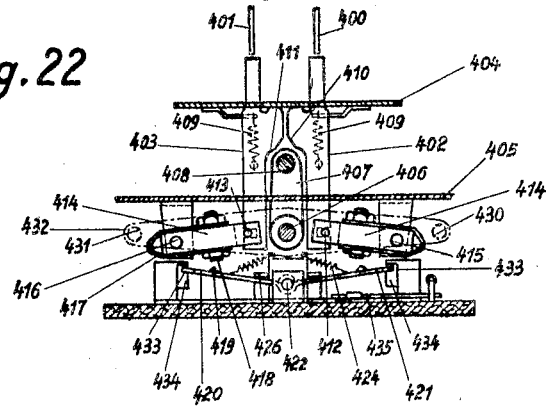
Figure 23:
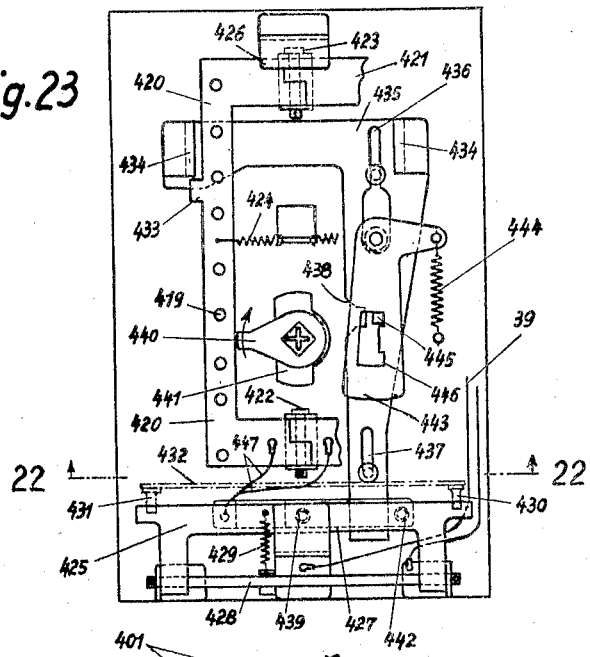
Figure 24:
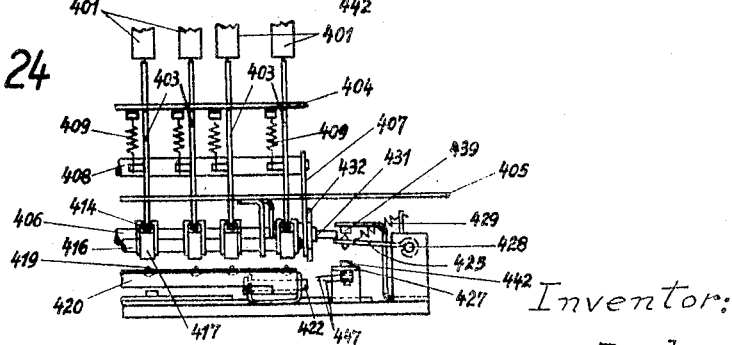

The invention is illustrated by way of example in the accompanying drawings, in which:

Figure 1 is a diagram of an electric selector mechanism comprising nine accumulators, Fig. 2 is a side elevation of an accumulator drum having eighteen accumulators and equipped for electrical operation, Fig. 3 is a section on the line 3—3 of Fig. 2, Fig. 4 is a section through the accumulator drum on the line 4—4 of Fig. 5, Fig. 5 is a section through the accumulator drum on the line 5—5 of Fig. 4, Fig. 6 is an elevation of the accumulator drum viewed from the operating side, the operating mechanism being removed, Fig. 7 is a view of the operating side of the accumulator drum, Fig. 8 shows a drive group for the accumulator numeral wheels of the drum, Fig. 9 is a side elevation of Fig. 8, Fig. 10 is a detailed view of the carriage jockey plate, Fig. 11 is a view of the carriage contact holder, Fig. 12 is a plan view of the parts shown in Figs. 10 and 11, Fig. 13 is a view of an accumulator on large scale, Fig. 14 is a side elevation corresponding to Fig. 13, Fig. 15 is a section through a solenoid coil and associated parts on a greatly enlarged scale, Fig. 16 is a section through the accumulator of a calculating machine of modified construction having adding and subtracting accumulators, Fig. 17 is an elevation of the accumulator of a calculating machine as shown in Fig. 16 viewed from the operating side with the operating mechanism removed, Fig. 18 is an elevation of the operating mechanism of the accumulator shown in Figs. 16 and 17, Figs. 19 to 21 show a switch for the parallel connection of two pairs of accumulators, Fig. 19 being a cross-section and Figs. 20 and 21 being side views in two different switch positions, Figs. 20a and 21a are wiring diagrams for the switch of Figs. 20 and 21, Fig. 22 is a cross-section of a switch mechanism for the selector keys, taken at line 22—22 in Fig. 23, the parts lying in front of the section line being indicated in dotted lines, Fig. 23 is a plan view corresponding to Fig. 22, Fig. 24 is a partial elevation corresponding to Fig. 23, and Fig. 25 is a vertical cross-sectional view of the complete machine.

As an example embodying the invention there is illustrated in Fig. 25 the calculating machine in which the numbers to be calculated are transmitted in known manner into accumulators, by means of actuators. The actuators are the parts 161, 162, with which the accumulators 706, 50 can be brought into engagement. The printing of the numbers which during a machine operation are either entered in the accumulators 706, 50 or are taken by totalling from these accumulators, is effected by means of type-carriers 160. The types on the type-carriers 160 in this operation strike against a platen roller which is arranged on an automatically movable paper carriage. In the following the selection of the accumulators 50 is explained in detail.

I

ARRANGEMENT OF THE ELECTRIC SELECTOR MECHANISM

Fig. 1 shows a diagram of an electric selector mechanism for nine accumulators which can be selected both by selector keys $1a$ to $1i$, and also in dependance upon the movement of the paper carriage 10 by means of contacts $38a$ to $38i$. The selection of the accumulators is effected with the aid of solenoids $11a$ to $11i$, the current supply of which is obtained from lines 22 and 23. In the line 22 is arranged a main switch 24 from which the line runs to a bus conductor 40 for the coils of the solenoids, $11i$, $11h$, $11g$, $11f$, $11e$, and which can be extended by switch connection at $12d$, $12c$, $12b$, $12a$, also to the coils of solenoids $11d$, $11c$, $11b$, $11a$. From the solenoid coils the current flows through the lower conductors either over the contacts $38a$ to $38i$ and the return conductor 39, with the switches 25, 244, or over contacts $2a$ to $2i$ and the return conductor 42, with the switches 25, 244 to the other line 23. The main switch 24, at each operation of the crank handle or at each operation of an electrically driven machine, is closed at a determined instant and is held closed for a determined period. Drive means for the switch 24 are shown in Fig. 1.

These drive means comprise a motor operating a shaft 26 through suitable gearing on which shaft is carried a crank 27. This crank 27 is connected by means of a thrust rod 28 to a crank 29 so that the shaft 30 will receive an oscillation through about 60°. The shaft 30 is the main shaft of the calculating machine, the outline of which machine is shown at 35. On the main shaft 30 is mounted a further crank 31 which actuates a drive rod 32, one end of which is jointed to a link 33 rotatable about 34. The switch 24 is connected to the drive rod 32 by a link 32a so that at a determined position of its stroke its contact is closed and remains closed up to a determined point of the return stroke. By closure of the main switch 24 the selector members set by the paper carriage or by the selector keys before starting of the machine are rendered operative in such a manner that the actuation of the parts set by the contacts for the selection of the accumulators takes place at the beginning of each machine operation.

The selection of an accumulator by the paper carriage is effected by means including rollers 36 interchangeably and adjustably mounted on the paper carriage and consisting preferably of fiber or other insulating material, which rollers cooperate with contact carriers 37 by means of which the contacts 38 are actuated. All the contacts 38 are connected with a conductor 39 on the side of the contact carrier 37. This conductor leads either over the switch 25 and the switch 244, or only over the switch 244, to the line 23. If, as shown in Fig. 1, the carrier contact 38f belonging to the solenoid 11f is closed, a current will flow upon closure of the main switch 24 from the line 22 over 24, 40, 11f, 38f, 37, 39, 25, 244, to the line 23, and operates an iron core of the solenoid 11f in such a manner that the accumulator corresponding to the set carrier contact is selected.

The selection of an accumulator by one of the selector keys 1a to 1i takes place as follows. On depressing any one of the selector keys a change-over bar 41 is first shifted to the right whereby the change switch 25 is so actuated that the conductor 39 leading to the contacts 37, 38 is disconnected from the line 23 and the conductor 42 is connected to said line. The change switch 25 serves for opening and closing the current paths 42, 239, 23 and 39, 239, 23 whereby either the contacts 38 or the selector keys 1a to 1i can be made operative or inoperative. By the said actuation of the switch 25 all the contacts 38 are rendered inoperative and the selection of an accumulator by the selector keys can take place without hindrance and independently of any accumulator which may have been selected by the movement of the paper carriage 10. On depression of the selector keys the contacts 2a to 2i are actuated which are connected through the bus conductor 42 and the switch 25 to the line 23 and are also connected in similar manner as the carriage contacts 38, with the solenoids 11a to 11i. If, for example, the key 1e is depressed, then the solenoid 11e is switched in by the associated contact 2e, and at the same time the solenoid 11f, shown in Fig. 1 as switched in by the carriage contact 38f, is rendered inoperative by the actuation of the switch 25, that is by the disconnection of the conductor 39. Selection by means of the selector keys thus has preference over selection by the carriage, which has the advantage in the operation of the machine that any accumulator can be operated as desired without hindrance due to the carriage position.

According to a further feature of the present invention, various accumulators can be combined into groups and from these groups individual accumulators can be selected automatically or manually and rendered operative for specific requirements. For example, according to Fig. 1 the accumulators associated with the solenoids 11a, 11b are combined into a group with parallel connection through a conductor 18ab, and the accumulators associated with the solenoids 11c, 11d are similarly grouped by a conductor 18cd. These groups are disconnected from the conductor 40 by interrupting the switch connections 12a, 12b, 12c, 12d. Furthermore, the solenoids 11a, 11b, 11c, 11d communicate by connectors 14a, 14b, 14c, 14d to a change switch 46 to which the conductor 40 is connected. This change switch 46 is operated by a lever 44 which is provided for setting an adding and subtracting totalizer 106 (Fig. 25) to its addition or subtraction position. The lever 44 may be actuated manually or automatically, for example, in dependence upon the positive or negative nature of the accumulator content of the adding and subtracting totalizer 106 (Fig. 25). In its addition position according to Fig. 1, and through corresponding contacts of the switch 46, the conductor 40 is connected with the solenoids 11b, 11d. If in this addition position, in a definite position of the paper carriage 10 a contact 38a, 38b is closed, or a contact 2a, 2b is closed by means of selector keys 1a, 1b, then the accumulator associated with the solenoid 11b is automatically rendered operative to receive a positive number set up in the machine or present in the adding and subtracting totalizer 106. By closing one of the contacts 38c, 38d or 2c, 2d, the lever 44 remaining in the same position, the accumulator controlled by the solenoid 11d is rendered operative to receive a positive number. On the contrary, with subtractive position of the totalizer 106 and in the changed position of the lever 44 indicated in Fig. 1 by a minus symbol, if the upper left and the lower right contact of the switch 46 are closed, only numbers can be registered in the accumulators associated with the solenoids 11a, 11c. Thereby an accumulator of a pair of accumulators corresponding to the position of the lever 44 is automatically made operative by means of the paper carriage or by the selector keys. Arrangements of this kind are of particular advantage in bookkeeping operations in banks and business offices, in which it is desired to keep balances separate from each other according as they are positive or negative, and to accumulate balances according to their positive or negative character in different accumulators and to print these balances either automatically in predetermined columns or selectively in desired columns, of a printed sheet. The amounts accumulated in the accumulators of a group can be printed automatically in dependence upon the paper carriage movement in one or more definite columns predetermined or at choice in any desired column, and can be transferred to an adding and subtracting totalizer 106 in order to determine the difference of the amounts of a group.

Instead of the connections 18ab or 18cd two contacts 38a, 38b or 38c, 38d may be closed. This may be effected, for example, by providing two rollers 36 or a single broad roller of the paper carriage for connecting the two contacts 38a, 38b or the two contacts 38c, 38d with the conductor 39. Similar results can be obtained by effecting a connection of the two contacts 2a, 2b or 2c, 2d.

This arrangement is not limited to the selection of groups comprising only two accumulators, which, as in the example cited, are utilized preferably for the automatic separation of positive and negative balances. This part of the invention which is claimed as a separate integer includes on the contrary the selection of an accumulator group of any desired number, and of any desired number of such accumulator groups, from which predetermined accumulators can be further automatically selected and rendered operative by changeover devices.

The group operation of accumulators, which in the present example serves to separate amounts to be printed in a single column according to positive and negative values, by means of the lever 44, can be rendered inoperative by switch means. This is effected by opening the connectors 14a, 14b, 14c, 14d and the connections 18ab, 18cd and closing the switch connections 12a, 12b, 12c, 12d. This renders the supply line to the change switch 46 inoperative, and the accumulators associated with the solenoids 11a to 11d are selectable like the other accumulators associated with the solenoids 11e to 11i. It is, moreover, of great advantage in respect of the range of use of a machine that group selection for the separation of balances and thus also the selection of any desired number of accumulators and any desired number of accumulator groups from which certain accumulators and accumulator groups can be automatically further selected and rendered operative, can be made inoperative and the group accumulators wholly or partly rendered available for other operations, for example for the usual column work. This feature of the invention therefore also constitutes an independent integer not necessarily combined with the other features of the invention.

The contacts 2a to 2d are shown in Fig. 1 as rotated about their pivots in such a manner that upon actuation of the selector keys 1a to 1d no closure of the contacts takes place. In the present instance, this has the purpose of preventing key selection of those accumulators which are disconnected for the separation of positive and negative items in determined columns. The other contacts 2e to 2i also can be rotated singly or as a whole about their pivots and thereby made inoperative upon actuation of their associated selector keys 1e to 1i. By shifting the switch 244, moreover, the connection of the line 23 with the conductor 42 can be completely interrupted, thus disabling the entire key selection and providing accumulator selection only by means of the paper carriage. The switch 244 for any one row, or all rows of the contacts 2a to 2i can be provided with locking means in order to render the actuation of such switches by the operator serving the machine, impossible.

In accumulator selection by the keys 1a to 1i, a separate symbol is printed in known manner upon depression of a key, whereby the selected accumulator is distinguished whereas in accumulator selection by the paper carriage no symbol is printed. This printing of the symbol is preferably effected by means of a type bar associated with the row of selector keys in similar manner as the ordinary type bars are associated with the series of digit keys.

II

THE ACCUMULATOR DRUM

Figs. 2 to 15 illustrate a calculating machine in which, in addition to the totalizer 706 (Fig. 25) suitable for addition and subtraction, there are provided eighteen accumulators for addition only in a fixed drum, these accumulators 50 (Figs. 4, 5, 13 and 14) being guided by means of guide members 49 mounted on their shafts 51 in radial slots of side plates 53, 54 (Fig. 4). The guide members 49 are fixed by means of screw 69 on the shafts 51 (Figs. 13, 14) and have round collars 57 (Figs. 4, 13) inside the side plates 53, 54 which collars have grooves for the reception of tension springs 55 anchored to pins 56, said pins 56, said springs operating generally to urge the accumulators outwardly from the center of the drum, so that the gears 58 engage the locking and alining bails 59 (Fig. 5). Since the collars 57 have greater dimensions than the guiding portions of the guide members 49, they secure the accumulator shaft 51 against axial displacement.

The accumulators are actuated by journaled actuator gears 60 (Figs. 8 and 9) associated in common with all the accumulators and having cam wheels 61 for tens carrying. The wheels 60 and 61 are loosely mounted on a sleeve 195 which is fixed between two frames 196, 197 mounted in the side plates 53, 54 by means of the through-going shaft 198 and two nuts 199. On the frames 196, 197 are secured attaching lugs 240 and also guide combs 241 for spacing all the wheels 60, 61 and also laterally bracing the frames 196, 197 relatively to each other. The parts illustrated in Figs. 8 and 9 constitute a closed unit which can be mounted in and removed from the accumulator drum in a simple manner.

The accumulators 50 are brought into engagement with their respective actuator wheels 60 and cam wheels 61 in the following manner: On the plates 53, 54 there are pivotally mounted for each accumulator a pair of levers 62, 63 on shaft 64 (Figs. 5, 13 and 14). These levers have at their outer ends oblique cams 65 cooperating with rollers 66 on the ends of the accumulator shafts in such a manner that on rocking of the levers 62 and 63 the accumulators, owing to the pressure of the cam 65 on the roller 66, are brought into engagement with the actuator wheel 60. In order that the screws 69 of the guide members 49 shall not contact with the side plates 196, 197 during the engaging movement, the side plates 196, 197 have recesses 242 (Fig. 9) to provide clearance for projecting members.

In order to engage an accumulator, the levers 62, 63 have to be connected with an engaging wheel 67 (Figs. 4, 6 and 7). This is effected by means of the solenoids 11a to 11i. The return of the levers 62, 63 is effected by means of springs 68 (Figs. 4 and 13) anchored to the shafts 64 and the side plate 54. The connection of the levers 62, 63 with the engaging wheel 67 by the action of the solenoids 11a to 11i takes place as follows: Each solenoid coil has guided therein an iron core 70 (Figs. 3 and 15) having screw connection with a core 71 of non-magnetic material, preferably aluminum. Owing to this formation of the core of a magnetic and a non-magnetic part, it results that upon energizing the solenoid the drawing-in movement of the iron core 70 is directly converted into an expulsion movement of the aluminum core 71. The aluminum core 71 carries on its front end a collar 72 which when the core is expelled from the coil bears against a coupling pin 73 (Fig. 4, 13). The coupling pin 73 extends through a hole in the lever 63, openings in the plates 54 and 53, and a hole in the lever 62 in such a manner that it can slide longitudinally, and it can engage holes 74 (Figs. 6 and 7) in the engaging wheel 67. It is retained in its inoperative position by a spring 75 (Figs. 4, 13). Upon energization of a solenoid by closing of the main switch 24 the aluminum core 71 is expelled, whereby its collar 72 forces the coupling pin 73 against the pressure of the spring 75 into a hole 74 of the engaging wheel 67 whereby the levers 62, 63 connected to the coupling pin 73 are obliged to follow the movement of said wheel. The engaging wheel 67 is so moved that the accumulators are brought into and out of engagement at the proper instant of the machine operation as required for the various functions of the machine, such as addition, total-taking, or sub-total-taking.

Addition

Since in the illustrated example the accumulators in addition must be made operative in the second half of a work operation of the machine, the engaging wheel 67 performs an angular movement at the beginning of the second half of the work operation of the machine, and carries along with it the pin 73 projected by a solenoid, whereby the associated levers 62, 63 cause their cams 65 to slide an accumulator into operative position. The movement of the engaging wheels 67 is effected from a thrust rod 76 (Figs. 1, 7 and 25) actuated by the machine drive, the rod 76 being connected to an arm which is fast on the main drive shaft 30 (Fig. 25). The thrust rod 76 is jointedly connected with a drive disk 77 rotatable through about 65° on a pin 78 carried by a plate 79 arranged parallel to the side plates 53, 54. On the plate 79, a slide member 82 is guided by means of pins 80, 81, 47 and slots 83, 84, 48. Springs 85, 86 urge the slide member 82 to the left in Fig. 7, the slots 83, 84, 48 bearing against the pins 80, 81, 47. The slide member 82 carries a pawl 87 pivoted on a pin 88 and held by a spring 89 in its normal position. During the first half of the work operation of the machine the drive disk 77 rotates in the clockwise direction. In this operation a pin 90 fixed to the disk presses the pawl 87 backwards against the action of the spring 89 until at the end of its movement the pin 90 slides along an arm 43 of the pawl 87. At the beginning of the backward movement, the drive disk 77 rotates reversely and the pin 90 bears in a notch 91 in the pawl 87, thereby moving the latter and the slide member 82 to the right. On the plate 79 a locking pawl 92 for the slide member 82 is pivoted about a pin 93, which pawl has a rearwardly extending arm 94 carrying a striker pin 95. At its front end the pawl has a pin 96 cooperating with a cam hump 97 on the drive disk 77. A spring 98 urges the pawl 92 into such a position that the pin 96 bears against the curved edge of the drive disk 77.

When the slide member 82 is forced to the right by the pin 90 arriving in the notch 91 of the pawl 87 upon reverse rotation of the drive disk 77, the pawl 92 engages behind a tooth 99 of the slide member 82 and locks the same in its advanced position. When the pawl 87 reaches its end position determined by a stop 107, the pin 90 slides out of the notch 91. The pawl 87 then returns to its position of rest under the action of the spring 89. The slide member is still held in its advanced position by the pawl 92. Finally, however, the hump 97 of the drive disk 77 actuates the pin 96 of the pawl 92 and releases it against the action of the spring 98 from its engagement with the tooth 99 of the slide member 82 whereby the latter also under the action of the springs 85, 86 can return to its initial position.

While the slide member 82 is moving to the right it actuates through a roller 100 rotatably attached to its right hand lower end, a cam plate 101 rotatable about a pin 102, the cam plate being thereby rotated clockwise and causing a roller 104 mounted on a double-armed lever 103 to roll up to its portion of enlarged diameter. This rocks the lever 103 about the pin 105 and the rocking movement is transmitted through a thrust rod 106 jointed at its other end to the engaging wheel 67 which wheel in its rotation shifts the pair of levers 62, 63 with which it is connected by the coupling pin 73, whereby the cams 65 of the lever pair move an accumulator 50 radially into the engagement position.

The return movement of the engaging wheel 67 is effected by a spring, not shown. The return movement of the levers 62, 63 is effected by 68, and the corresponding accumulator 50 is drawn by its springs 55 out of engagement with the actuator wheel 60 and into engagement with the locking and alining ball 59.

To prevent the engaging wheel 67 from moving backwardly too rapidly and withdrawing the engaged accumulator before a tens carrying extending over all its numeral wheels is completed, the cam plate 101 is connected with a brake. A plunger rod 707 is jointed to the cam plate 101, the plunger of which reciprocates in a brake cylinder 108. At the lower end of the brake cylinder 108 there is arranged a valve with a spring urged needle 109 by opening which a large flow orifice can be obtained enabling the braking to be wholly or partly annulled. Use is made of this device in total-taking as hereinafter described.

Non-addition

If an accumulator is not to be engaged either during the first or the second half of a work operation of the machine, movement of the slide member 82 is prevented by removing the pawl 87 entirely out of the path of the pin 90. For this purpose dogs 111, Figs. 7 and 25, on the paper carriage are provided to rock a double-armed lever 112, 113 about its pivot 114, this lever being under the action of a tension spring 237. Thereby and through a pull rod 115 a pawl 116 with a plurality of arms is rotated about a pin 117 on the plate 79. A similar rocking movement can also be effected from a rod 156 also attached to the pawl 116 and connected with a non-addition key, not shown. One arm of the pawl 116 carries a pin 118 engaging in a slot 119 of a push rod 120. The other end of the rod 120 is jointed at 121 to a lever 122, 123 rocking on a pin 124. At the lower end of the lever arm 123 there is jointed a slide 126 guided by a pin 128 engaging a slot 127 in the slide. The front edge of the slide 126 cooperates with a pin 129 of the pawl 87. In the above mentioned rocking of the pawl 116, the pawl 87 is so rotated on its pivot 88 by means of the intermediate members 118 to 126 acting upon the pin 129, that the notch 91 is moved out of the path of the pin 90 of the drive disk 77. The rocking movement of the drive disk 77 therefore remains ineffective.

The pawl 116, when it is turned counter-clockwise by the manual non-addition member or by the dog 111, will free one of the pins of the lever 448. In this way, the lever 448 can rest against the rear part of a shoulder 238 of the track 135 by the right end of the lever under the influence of a spring. The slide 135 is, therefore, locked when the machine is set on non-addition.

*Total-taking*

In taking a final total, in the illustrated example, the accumulators must be in engagement during the first half of the work operation of the machine and out of engagement before the beginning of the second half of the work operation, that is in their zero position. The slide member 82 must thus be advanced to the right at the very beginning of the right hand rotation of the drive disk 77, and during its return rotation to the left the pawl 87 must not be influenced by the pin 90. To drive the slide member 82 during the first half of the operation of the drive disk 77 there is provided a pin 130 fixed to the drive disk 77 and which can cooperate with a pawl 132 rotatable on the pin 131 of the slide member 82, which pawl 132 is similar to the pawl 87.

To carry out a total-taking operation the pawl 132 with its arm 133 and notch 134 is shifted in the following manner into the path of the pin 130. By pressing the total key, and also by pressing the sub-total key, a slide 135 is shifted longitudinally to the left, this movement taking place through a full stroke in total-taking, and through a half stroke in sub-total-taking. The slide 135 has slots 136 for its guidance on pins 137 and is connected at one end through a link 138 with a lever 139. Upon depressing the total key the lever 139 receives a full stroke rocking movement causing the slide 135 to move to the left by the full distance. This causes a heel 140 on the slide 135 to separate from a pin 141 on the pawl 132 whereby the latter under the tension of a spring 142 rotates about the pivot 131 and arrives in the path of the pin 130. Upon displacement of the slide 135 to the left, a pin 143 thereon also cooperates with the lever arm 122 rocking it counter-clockwise about the pivot 124 so that similarly in the case of non-addition previously described, the pawl 87 is rocked out of the path of the pin 90. The lever arm 123 is thus moved so far to the right that it comes into contact with the pin 95 of the arm 94 of the pawl 92 pivoted at 93, and thus prevents the pawl 92 from engaging behind the tooth 99 of the slide member 82. The drive disk 77 now commences its rotation, the pin 130 pushes the pawl 132 and the slide member 82 to the right so that the selected accumulator is rendered operative during the first half of the machine operation. At the end of the first half of the operation of the machine, the pin 130 passes the pawl 132 and the slide member 82 springs backwards, the pawl 92 being prevented from dropping into the tooth 99. This springing back of the slide member 82 must take place rapidly in order that at the beginning of the return stroke of the machine the actuator is reliably out of engagement with the actuator toothed wheels 60. In this case the retardation of the return movement of the slide member 82 by the brake device 107, 108 is annulled, for which purpose a double-armed lever 243, 144 is provided, fulcrummed at 102. The fork-shaped end of the lever arm 243 embraces a pin 145 mounted on the slide 135. During movement of the slide 135 the lever 243, 144 is therefore rotated counter-clockwise. The lower end of the lever arm 144 in this movement causes a bent portion thereof to press against the valve needle 109 and establishing communication between the brake cylinder 108 and the atmosphere, annulling the braking action.

During the entire total-taking operation the slide 135 is retained in its displaced position to the left. This is effected by means of an angle latch 146 having a slot 147 for guiding it on a pin 148, and drawn upwardly by a spring 149. The angle latch is unable to follow the drive disk 77 into the position of rest because it is jointed at its lower end to the arm 150 of a double-armed lever 150, 151, the arm 151 of which bears against a pin 152 on the drive disk 77. As soon as the drive disk 77 commences the forward stroke of its oscillating movement, the pin 152 is moved away from the arm 151, so that now the angle latch 146 can respond to the tension of its spring 149 and engage behind a projection 153 of the slide 135. On the return stroke of the drive disk 77 the pin 152 again encounters the arm 151 and thereby releases the locking. The slide 135 is then forced to the right into its position of rest by its spring 154.

*Sub-total-taking*

On taking a sub-total the accumulator in engagement must remain in engagement after printing the total so that the subtotal taken from it is again brought into the accumulator. The necessary setting movements of the mechanism are effected by longitudinal displacement of the slide 135 under the action of a sub-total key, the stroke, however, being only half the stroke accomplished in total-taking. This half stroke is sufficient to release the pawl 132 which is also actuated in total-taking, so that this pawl, as in total-taking, arrives in the path of the pin 130. During the operation of the machine the angle latch 146 engages behind the projection 194 of the slide 135 in similar manner as it engages behind the projection 153 after the full stroke in total-taking. Since the pin 143 in the short stroke of the slide 135 does not reach the lever 122, 123, the pawl 92 is not prevented from dropping. The selected accumulator is thus engaged in the first half of the work operation of the machine as in total-taking, but as in addition the pawl 92 drops and holds the slide member 82 during the second half of the work operation in its right hand displaced position. Thereby the selected accumulator remains in engagement as during addition, until the hump 97 bears against the pin 96 and releases the pawl 92 to permit the slide member 82 to return to its normal position. The lever 243 upon taking a sub-total is not shifted sufficiently to open the valve 109.

In a certain mode of operation of the machine, namely when the carriage after it has traversed a plurality of summation columns, enters a non-addition column and the total key has been kept depressed either for convenience or inadvertently, it may happen that in the non-addition column a row of nines is printed, because by depressing the total key the locking of the rack sectors is released. To prevent this, the carriage when it moves from a total column into a non-adding column and also when the total key remains depressed, must again render operative the locking of the rack sectors. For this purpose a rod 156 is jointed at 155 to the pawl 116. When the carriage dog 111 encounters the levers 112, 113 causing the pawl 116 to be shifted by the rod 115, the rod 156 which engages at 157 with a crank arm 159 fulcrumed at 158, is shifted to the right and through intermediate members not illustrated again renders operative the locking for the rack sectors. If the total key is not depressed when the carriage springs into a non-adding column then the total-taking device is locked as a result of rocking of the lever 116 which pushes a spring pressed pawl 448 below the lug 238 of the totalling slide 135 (Fig. 7).

III

TENS CARRYING

The drive of the actuator or number transfer wheels 60 is obtained from the type bars 160 (Fig. 5) which in turn are driven by the rack sectors 161. The type bars 160 are connected at their lower end with racks 162 which can slide longitudinally by a certain amount relative to the type bars and which are forced downwardly by means of springs 163, 164 attached between the type bars and the racks. The racks 162 are in driving connection with the wheels 60 either directly or through intermediate wheels 165 engaging their lower ends.

The gear wheels 58 of the accumulators 50 have tens carrying humps 166 (Fig. 13) cooperating with corresponding teeth 167 (Fig. 9) of a tens carrying wheel 61 serving all of the wheels 58 of the same digital order. Each tens carrying wheel 61 has a set of teeth 168 engaging teeth in the arm 169 of a three-armed lever 169, 170, 171 (Fig. 5) and a further movement of the rack 162 in tens carrying operates the next highest order through one step.

By means of springs 173 (Fig. 5) engaging the arms 170, the three-armed levers are constantly urged in the left hand direction so that they can bear against a stop 174 in their position of rest. The upper arms 171 have bent portions which lie below projections 181 of the racks 162 of the next higher orders and hold these against the action of the springs 163, 164 in the position shown in Fig. 5. On rotation of a three-armed lever 170 in the right hand direction against the action of its spring 173, the bent portion 171 moves out of the path of the projection 181 of the rack 162 of the next higher order so that this rack under the tension of its springs 163, 164 can move downwardly to the extent of one tooth. To retain the displaced position of the lever 169, 170, 171 it has a shoulder 175 engaged by a bent portion of a lever 177 under the action of a spring 179. To unlock and restore to normal the three-armed lever 169, 170, 171, there is arranged a control device actuated by the machine operation, in the present construction a flat sided shaft 180, the rotation of which shifts the lever 176, 177 against the action of the spring 179, and the spring 173 when the notch 175 is released is freed, and enables the three-armed lever 169, 170, 171 to return to rest position together with the cam wheel 61 positively connected thereto by the teeth 168. The connection of the lever arms 169 with the cam wheels 61 arranged in the accumulator drum through the loosely engaging teeth 168 has the advantage that the accumulator drum can easily be removed from the machine and equally easily remounted therein when the machine is being assembled and repaired.

The calculation with tens carrying in the accumulators 50 serving for accumulation of amounts proceeds in the following manner.

In forward operation of the calculating machine the racks 162 which are guided by rods 184, 185 traversing slots therein, are raised according to the preset digits whereby through the agency of the intermediate wheels 165 the amount transferring wheels or actuator wheels 60 engaging the said wheels 165 are correspondingly rotated, and in addition the engagement of the accumulator selected in the above described manner takes place before the beginning of the return stroke. During the return stroke of the actuator wheels 60 the digits are transferred into the corresponding accumulator 50.

If in this procedure one of the numeral wheels has passed through the tens position, then its tens carrying hump 166 cooperates with the tooth 167 of the tens carrying wheel or cam wheel 61 of the next higher order and rotates this through a certain amount. The lever 169, 170, 171 connected through the teeth 168 with the wheel 61 is thereby displaced against the tension of the spring 173. The bent portion of the lever 176 engages the shoulder 175 and holds the lever 169, 170, 171 in its displaced position. When subsequently the type bar 160 and the rack 162 of the next higher order are lowered again, the projection 181 passes beyond the bent portion of the arm 171. The rack 162 turns the intermediate wheel 165 of the next higher order by the amount of the additional lowering and also the associated digit transfer wheel 60 which latter actuates the associated accumulator wheel through one step.

The restoration of the members displaced in tens carrying is effected in the illustrated construction during the next crank operation, and in the following manner.

A pin 152 mounted on the drive disc 77 (Fig. 7) makes contact during the forward stroke with the arm 186 of a two-armed lever 186, 187 fulcrummed at 128 and imparts thereto a left hand rotation. To the arm 187 of this lever is jointed a thrust rod 188 attached to a crank 189 on the shaft 180 and also imparts a left hand rotation to the said crank. By the rotation of the flat sided shaft 180 (Fig. 5) the restoration of the two-armed lever 177, 176 against the action of the spring 179 takes place. This frees the shoulder 175 and the three-armed lever 169, 170, 171 as well as the cam wheel 61 positively connected thereto, are brought back to the initial position by the action of the spring 173. The restoration of the flat sided shaft 180 and of the mechanism connected therewith is accomplished after restoration of the pin 152 by means of a spring 190 attached to the thrust rod 188.

The actuation of the total key and the sub-total key for the drum accumulators is prevented when either one or some or all the levers 169, 170, 171 are not yet in their position of rest. For this purpose a thrust rod 192 is jointed by means of a pin 191 to the arm 144 (Fig. 7) of the two-armed lever 243, 144 which lever on depressing the total key or the sub-total key is actuated by the slide 135, such thrust rod 192 operating a crank arm 193 on the shaft 182. To the shaft 182 there is attached a feeler bar 183 (Fig. 5) which can make an anti-clockwise rotation only when all the three-armed levers 169, 170, 171 assume the position of Fig. 5. If, however, one of these levers is displaced owing to a tens carrying, its arm 170 lies in the path of the feeler bar 183 and prevents movements of the parts 182, 193, 192, 144, 243 and therefore the actuation of the total keys. Only after all displaced tens carrying pawls 169, 170, 171 have been brought back to their position of rest by an idle stroke can the total or sub-total keys be actuated since the feeler bar 183 then encounters no resistance.

IV

ARRANGEMENT OF THE ELECTRIC CONNECTION AND CONTROL MEMBERS

The conductors leading from the contacts 38a to 38i (Fig. 1) actuatable by the carriage and the key contacts 2a to 2i to the solenoid coils are not led singly to their coils but are combined as separate connection groups to separate connection rings of insulating material as in Figs. 2, 3 and 15. The conductors coming from the keys are led to a connection ring 200 and those coming from the carriage to a connection ring 201. At the connection places in the rings 200 and 201, hubs 202 and 203 of metal and also the associated cable thimbles 204, 205 are riveted. The cables are soldered in their thimbles in the usual manner. They then remain generally permanently conected with the connection rings so that faulty connections cannot take place and the insertion and removal during assembly and repair of the machine are made extremely simple. The connection rings 200, 201 have their hubs 202, 203 threaded on studs 206 attached to the coil carrier plate 207 by means of nuts 208, 209, and they are secured to these studs by nuts 210. Upon removing these nuts the rings 200 and 201 with all the connections of a group can be removed as a unit. This gives the advantage that a machine can be set up either for key selection alone or for carriage selection alone, according to the wish of the purchaser in a very simple manner, and employing only normal parts. One of the two connection rings is then simply left off with all the cables attached thereto, and can easily be remounted upon subsequent reconditioning of the machine.

The coil carrier plate 207 of strong insulating material is attached by means of screws 212 to projections 211 (Fig. 3) of the side wall 54 of the coil drum, and receives the heads of the coil frames 213 which are retained by a ring 214 on the other side, which ring is also of strong insulating material and connected to the plate 207 by means comprising distance bolts 215, screws 216, and nuts 217. The coil windings are all connected at one end through connecting strips 218 to a common bus bar 219 fixed inside the ring 214. On the other side the winding of each coil terminates in a terminal 220, each of these terminals being soldered to a further terminal 221. All the terminals 221 are secured by means of the nuts 209 to respective bolts 206 (Fig. 15) and 382 (Fig. 19) and thus connected with the rings 200, 201. The carrier plate 207 constitutes together with the ring 214, the solenoid coils 11a to 11r, and the associated connecting members, a closed solenoid unit, which by merely removing the screws 212 can be mounted as a unit in the machine and removed therefrom.

The contacts 38 (Figs. 11, 12) for the carriage selection are combined in similar manner to form an easily mounted and removable unit. The contact springs 222 are in the form of interlacing alternated tongues spaced a very small distance apart and riveted to a housing 223 of bent sheet metal. To prevent them from springing from their backing they are held thereto by means of cover plates 224, 225 secured to said backing. For cooperation with the rollers 36 on the carriage the contact springs have resilient projecting bent portions carrying the contacts 38 at their free ends. All the contact springs 222 are in conductive connection with the casing 223 and the casing is connected with a common supply conductor 226. A plate 227 of insulating material is inserted in the casing on which are mounted the counter contacts associated with the contacts 38, which counter contacts are riveted to the cable thimbles. The plate 227 thus constitutes a closed connection unit for all the cables. The plate 227 is connected with the casing 223 by means of screws 232 (Fig. 12) on which distance rollers 233 are mounted, which hold the plate 227 and therefore the counter contacts 38 at a suitable distance from the front wall of the casing 223 and the contact springs 222. The plate 227 in its turn is fixed to an angle member 229 by means of screws 230. Instead of nuts, bars 231 (Fig. 12) are arranged on the inside of the plate 227 which are provided with threads for receiving the screws 230. The angle member 229 is attached to the cover plate 234 of the accumulator drum by screws 233 (Fig. 7). This angle member 229 with all the parts mounted thereon constitutes a unit which is easily removable from the machine.

The rollers 36 are rotatably mounted on carriers 238 which are mounted by means of screws 237 or other fastenings in bores 236 of a plate 235. This plate 235 is preferably of drawn aluminum and is removably mounted on suitable projections of the paper carriage 10. The bores 236 are preferably arranged in superposed horizontal rows similar in number to the contact springs 222 for switching in accumulators. Each horizontal row of bores 236 thus serves for switching in a determined accumulator. The distances of the bores 236 from each other within the horizontal rows correspond preferably to the distances of the type carriers 160 and printing types from each other or a multiple thereof. This has the advantage that the roller carriers 238 according to their adjustment can have their rollers 36 cooperate with the contacts 222 at any desired position of the paper carriage, and switch in accumulators 50.

On the plate 235 symbols may be marked indicating the association of the several bores 236 with the accumulators, on the one hand, and also their horizontal distance, for example, from the beginning of a printing line. This greatly simplifies the mounting of the rollers 36 when it is required to adjust the roller to another accumulator or to another column. The plate 235 with all the rollers attached thereto constitutes a closed unit readily adjustable to the paper carriage and readily removed therefrom. Obviously the arrangement may be such that the contacts can be controlled by a separate carriage other than the actual paper carriage, or the plate may be fixed and the contacts mounted on a carriage.

V

ACCUMULATORS FOR ADDITION AND SUBTRACTION

Figs. 16, 17 and 18 show a further example of a calculating machine according to the invention in which the accumulators are also adapted for subtraction. Since Figs. 16, 17 and 18 correspond to Figs. 5, 6 and 7 in many parts, corresponding parts in the two constructions are designated by the same references.

According to Fig. 16 in the second constructional form two rows of accumulators 50 are present. In the arrangement, for example, in straight rows in series, in this case rack bars 251 with teeth on their upper and lower edges are used for transferring digits into the accumulator 50. In each order of the accumulator there is provided a cam bar 252 for tens carrying. The rack bars 251 and the cam bars 252 are arranged in alternation and are longitudinally guided by means of rollers 254 engaging slots 253.

The accumulators 50 are slidable in slots 52 in side plates 250 in similar manner as in the slots in the side plates 53, 54 of the previously described accumulator drum and are brought into engagement with the actuator racks 251 by shifting lever pairs 62, 63 in a manner similar to the operation of the previously described construction.

The movement of the levers 62, 63 is obtained from a drive frame 255 (Fig. 18) which is reciprocated at each work operation of the machine by means to be hereinafter described. The levers 62, 63 are coupled to the drive frame 255 by solenoids in similar manner to the engagement of the accumulator drum with the engaging wheel 67. The reciprocation of the levers 62, 63 also takes place as in the first example by means of springs arranged on the shaft 64.

The control members for addition, non-addition, total-taking and sub-total-taking remain the same as in the first construction. The corresponding drive movement of the frame 255 is derived from the cam disc 101 connected with the slide member 82 (Fig. 18) in the following manner. On the base plate 256 of the control members a lever 258 is fulcrumed at 257, to which lever a roller 259 is attached bearing against the cam disc 101. At the lower end of the lever 259 there is jointed at 260 a thrust rod 261 engaging the frame 255 and transmitting the motion of the cam disc 101 to the said frame. The restoration of the frame 255 to its initial position is effected by a spring, not shown.

In both constructional examples there is provided a common engaging member 67 or 255 for all the accumulators by means of which the selected accumulators can be engaged at different periods of the machine operation, according to the kind of calculation to take place at such periods. Obviously also each accumulator or a plurality of accumulators may have separate engaging members, singly or in groups, whereby especially in machines with separate tens carrying for single or all the accumulators, great independence in the use of the accumulators by selector devices according to the present invention is possible.

VI

DRIVE OF THE ACCUMULATORS FOR ADDITION AND SUBTRACTION

The drive of the racks 251 is derived from the type bars 160, Fig. 16. These latter are connected at their lower ends with racks 262 having teeth on both edges which slide longitudinally for a certain amount relatively to the type bars and can also be laterally shifted. By means of springs 263, 264 anchored between lugs on the type bars 160 and the racks 262, the latter are urged downwardly. The racks 262 are guided by means of slots 265, 266 and shafts 267, 268 carrying rollers. These shafts, Fig. 18, are mounted eccentrically in a lever 269 and in a disk 270, respectively, so that displacement of the parts 269, 270 produces lateral shifting of the shafts 267, 268 and also of the racks 262. The racks 262 are thereby engaged either with the intermediate wheels 271 or the oppositely located intermediate wheels 272, and transmit their vertical motion through the engaged intermediate wheels to the drive racks 251 which are thereby actuated either to the right or to the left. It is immaterial which of the movements is used for addition and which for subtraction. In the present case, the movement through the gear 272, which in the down stroke of the racks 262 effects a shifting of the actuator racks 251 to the left, is employed for addition, and the movement through the gear 271 is used for subtraction. The shifting of the parts 269, 270, Fig. 18, for the purpose of lateral movement of the racks 262, is effected as follows: By means of an addition-subtraction changeover lever, not shown, for the accumulator 50, the bell-crank lever 274, 275 fulcrumed at 273 is actuated through a thrust rod from the subtraction position illustrated in Fig. 18, in anti-clockwise direction. The arm 275 is forked and embraces a pin 276 of a thrust rod 277 which rod is jointed at 278 to the lever 269 and at 279 to the disk 270, and is also influenced by a tension spring 280 attached to its lower end. In rocking the bell-crank lever 274, 275 the thrust rod 277 is moved downwardly and rotates the parts 269, 270 in such a manner that the eccentrically disposed shafts 267, 268 are shifted laterally and bring the racks 262 into engagement with the right hand intermediate wheels 272.

VII

TENS-CARRYING OF THE ACCUMULATORS FOR ADDITION AND SUBTRACTION

Two separate tens-carrying mechanisms are provided for addition and subtraction, which upon shifting of the addition-subtraction change lever are alternatively made operative and inoperative, the mechanisms provided for addition being also employed in total-taking. In the drawings, the tens-carrying mechanism operative in subtraction is shown in working position. In the forward operation of the machine the racks 262 are raised corresponding to the pre-set digit values, and through the agency of the intermediate wheels 271 the actuator racks 251 are shifted to the left. At the end of this movement the selected accumulator is brought into engagement. In the following return stroke of the racks, accumulator numeral wheels are rotated and the digit values transferred into the accumulator. If in this operation any numeral wheel rotates beyond the tens limit, its tens-carrying hump 166 cooperates with a tooth 281, Fig. 16, of the corresponding cam bar 252, lying in its path and shifts this bar a certain distance to the right.

The cam bars 252 have at their rear ends extensions 282, Fig. 16, provided with heels 283, 284. On a shaft 285 three-armed detents 286, 287, 288 are pivoted, a spring 289 engaging the arm 286. This arm 286 at its upper end has a bent portion against which the heel 284 bears. The two-armed tens-carrying pawls 290, 291 are fulcrumed at 292, and a tension spring 293 is attached to each arm 290. The bent portion at the end of the arm 290 engages in a notch of the arm 288. Each arm 291 has a bent portion against which bears an extension 294 of each actuator rack 251.

Each cam bar 252 in its right hand movement effected by a tens carrying hump 166 causes its heel 284 to shift, the associated three-armed detent 286, 287, 288 in clockwise direction, so that the corresponding tens carrying pawl 290, 291 is released and can move under the action of its spring 293. The arm 291 thereby releases the extension 294 of the actuator rack 251 of the next higher order so that this rack at the end of the downward movement of the racks 262 under the action of the springs 263, 264, is advanced one step further to the right, by means of the intermediate wheel 271. In this manner the numeral wheel of the next higher order is advanced one step.

The actuator racks 251, during return movement of the type carrier 160 in the next machine operation, are returned to their original position. The restoration of the other parts also takes place in the next machine operation by the shifting of a flat-sided shaft or bar 295 in clockwise direction. This bar returns all the freed tens carrying pawls 290, 291 to their original position so that when the arms 288 of the detent pawls, under the pull of the springs 289 again engage, the arms 286 can positively return the cam bars 252 against the heels 284. An end stop for the cam bar 252 is provided in the form of a flat-sided rotatable shaft or bar 296.

The shifting of the rotatably mounted bar 295 for initiating the restoration of the pawls takes place as follows: On the bar 295 there is fixed a lever 297, Fig. 17, to one end of which is hooked a spring 298 while the other end carries the pin 299. On the end of the bar 295 and on the end of a corresponding bar 300 of the upper tens carrying mechanism, there is mounted a slide 301 movable longitudinally by means of slots 302, 303. On the slide 301 there is pivoted at 304 a two-armed lever 305, 306, the end of the arm 306 having the form of a hook while the end of the arm 305 in the position illustrated, bears against the pin 299. The arm 305 in this position is drawn in clockwise direction by a spring 311 which is fastened to a pin 312 on the slide 301. The slide 301 also carries a guide pin 307 engaging a slot in the arm 308, Fig. 18, of a two-armed lever 308, 310, pivoted at 309. The arm 310 extends into the path of a pin 313 fixed on the drive disk 77. On forward movement of the drive disk 77 in clockwise direction, the pin 313 strikes against the arm 310, shifting the levers 310, 308, and slides the slide 301 together with the arm 305 downwardly so that the latter bears against the pin 299 and rocks the lever 297 and therefore the bar 295 in clockwise direction. This mechanism after the arm 310 is again freed, is restored to initial position by means of a spring 314 anchored to the slide 301.

The disk 270, Fig. 18, is held in its positions by a plurality of detents. In the illustrated position for subtraction, all the parts being in position of rest, only one detent 315 is operative which is pivoted at 316 to a two-armed pawl 317, 318 and forced by a spring 319 against the notched edge of the disk 270. The pawl 317, 318 is pivoted about a pin 320. A spring 321 is fixed to the arm 317 and under the action of this spring the arm 318 bears against the pin 260. During a work operation of the machine the cam disk 101 rocks the lever 258 and forces the pin 260 against the arm 318. Thereby the detent 315 is moved out of the path of the disk 270 so that the detent is shifted by the spring 319 out of the lower end notch of the disk 270. At the same time, however, the disk 270 is retained by a two-armed lever 322, 323 pivoted about the pin 257, the arm 323 of which has a bent portion engaging under the action of a spring 324 in an upper recess in the disk 270, Fig. 18. In the position of rest the arm 323 is prevented from dropping by its other arm 322 being held by means of a pin 325 on the angle member 146. The angle member 146 is moved upwardly, however, under the tension of the spring 149 as soon as the pin 90 of the disk 77 moves away from the arm 151 at the beginning of the machine operation. The pin 325 also accompanies the angle member in its upward movement, so that the arm 323 can drop into the recess 321a. At the end of the machine operation, the encounter with the pin 90 again lowers the angle member 146 and therefore raises again the detent arm 323. Since the detent 315 was released by the joint 260 encountering the arm 318 at the beginning of machine operation, the disk 270 is now, that is, at the end of the machine operation, freely rotatable and is turned to the right under the tension of the spring 280. This involves disengagement of the subtraction tens carrying and the movement of the addition tens carrying into operative position. This arrangement is provided because operation of the accumulators for addition is the normal operation, and subtraction is regarded as exceptional. When the subtraction key is depressed, therefore, only a single work operation with tens carrying for subtraction is carried out, whereupon all the parts automatically change over for addition. If repeated subtraction is desired then in the machine illustrated the subtraction key must be again depressed.

After right hand rotation of the disk 270 in the addition position the pawl 315 rests at a shoulder 326 on the periphery of the disk while the bent portion of the arm 323 lies opposite the upper end notch 327 of the disk 270 and is ready to drop into it at the beginning of the machine operation in order to lock the disk 270 during the addition operation.

The changeover of the tens carrying mechanism from the subtraction position shown in Fig. 18, to addition, is effected by right hand rotation of the disk 270 through a thrust rod 329 jointed thereto at 328, which rod is linked to an arm 330 of a two-armed lever 330, 331. This lever is attached to the flat-sided rock shaft or bar 332. As a result of the rocking of the bar 332 by means of the thrust rod 329, all the detents 286, 287, 288 are disengaged, see Fig. 16, so that all the tens carrying pawls 290, 291 are released and can respond to the spring 293 so that they no longer stand in the path of the extensions 294 of the actuator racks 251. At the end of the lever arm 331, Figs. 17, 18, there is jointed a thrust rod 333 which operates a lever arm 334 mounted on the flat-sided bar 296. The bar 296, Fig. 16, is thereby rocked anti-clockwise simultaneously with the bar 332. It then no longer serves as a stop for the extensions 284, Fig. 6, but as a stop for the extensions 283 of the cam bars 253 which in tens carrying for addition, operate in the reverse direction. The changeover movement is further transmitted from the bar 296 through an arm 335 attached thereto, Fig. 17. To the arm 335 there is jointed a thrust rod 336 which engages a further arm 337 fixed on a flat-sided shaft or bar 338 which is therefore also rocked in anti-clockwise direction. This bar carries an arm 339 having a thrust pin 340 and on rocking of the bar 338 this pin 340 bears against the back of the hook-shaped arm 306 in such a manner that the mouth of the hook is forced over a pin 341 fixed on one end of a double lever 342 mounted on the flat-sided shaft 300. To the other arm of this lever there is fixed a spring 343 which urges the double lever 342 against an abutment pin 344. At the beginning of the work operation of the machine there takes place immediately a clearing operation of the upper tens carrying mechanism. When the hook-shaped arm 306 bears against the pin 341 the arm 305 is rocked outwardly so that it can no longer act upon the pin 299. If the slide 301 is now moved downwardly by the arm 308, Fig. 17, it rotates through the agency of the hook 306, the cross lever 342, and also the bar 300, Fig. 16, in the clockwise direction. Thereby the upper two-armed tens carrying pawls 345, 346, Fig. 16, pivoted about a shaft 347, are carried into their prepared position. In this motion the bent portion of the arm 346 constitutes the stop for the return movement of the actuator racks 251, and the arms 348 of the three-armed detent pawls 348, 349, 350, which are pivoted at 351, again engage behind the bent portion at the end of the arm 345, since the bar 338 is no longer in the way of the arms 349. Springs 352 are anchored to the arms 345 of the tens carrying pawls 350, and springs 353 to the arm 350 of the detent pawl.

Since the upper tens carrying mechanism is employed both in addition and in total-taking, it is provided with a feeler bar 354, Fig. 16, corresponding to the feeler bar 183, Fig. 5, which bar 354 rocks about an axis 355 and serves similar purposes as described for the bar 183. The rocking of the feeler bar about the axis 355 of the feeler bar is derived from the totaling slide 135, Fig. 18, similarly to the rocking of the feeler bar 183. To a terminal extension of the totaling slide 135 there is jointed a thrust rod 356 attached to an arm 357 on the shaft 355. The slide 135 can only be shifted, and the total or sub-total keys can only be operated, when the feeler bar 354 is not obstructed by an arm 350, that is, when all the tens carrying and detent pawls have been restored to their normal position.

The restoration of all the parts belonging to the upper tens carrying mechanism is effected in similar manner as for the lower tens carrying mechanism for subtraction.

The two constructional examples relate to machines with comparatively simple accumulators. The invention, however, is suitable for use in machines in which the accumulators have auxiliary mechanisms such as devices for considering the fugitive unit and means permitting printing of correct negative totals.

VIII

DISABLING OF THE AUTOMATIC BALANCE SEPARATION

In order that the solenoids 11a to 11d may operate corresponding accumulators both for separation of the balances according to positive and negative amounts, and also so that they like the other solenoids 11e to 11h may operate corresponding accumulators, there is provided a switch 391 shown in Figs. 19 to 21.

The conductors 13a, 13b, 13c and 13d corresponding to the conductors leading from the changeover switch 46, Fig. 1, to the solenoid coils 11a, 11b, 11c, 11d, are connected with the terminals 14a, 14b, 14c, 14d from which leads 15a, 15b, 15c, 15d indicated by dotted lines lead to terminals 16a, 16b, 16c, 16d. These terminals are mounted on contact members 219a, 219b, 219c, 219d arranged as extensions of the bus-bar 219 on an annular plate 214 but have no conductive connection with each other. Each of these contact members is connected with one end 381 of the winding of the solenoid. The other end of each solenoid winding is soldered, as in the construction hereinbefore described, to a corresponding connection strip 221. Each of the four connection strips 221 is secured by means of a nut 208 on a bolt 382 which is longer than the bolt 206 shown in Fig. 15. The bolts 382 like the bolts 206 have connections to the conductors on the rings 200, 201 from which rings these conductors lead to the key contacts and the contacts actuatable by the paper carriage. Furthermore, the bolts 382 are each connected with a contact plate 17a, 17b, 17c, 17d fixed thereto.

On a fixed plate 384 of insulating material, there is mounted a bolt 385 on which a sleeve is rotatably mounted and connected with two disks 387, 388 of insulating material. The disk 387 carries the terminals 14a, 14b, 14c, 14d and also two small plates 18ab, 18cd in the form of terminals. In Figs. 20, 20a the small plate 18ab, which bears against the contact plates 17a, 17b connected to the coils of the solenoids 11a, 11b, forms a parallel connection of the solenoid coils and of the associated accumulators, and the small plate 18cd by contact with the plates 17c, 17d similarly forms a parallel connection of the coils of the solenoids 11c, 11b and associated accumulators. At the left hand side in Figs. 20 and 21, the disk 387 has a notch 389 into which projects a pin 390 fixed on the plate 384 and permits only a small rotational movement of the disk 387. The other plate 388 mounted on the rotatable sleeve 386 carries the terminals 16a, 16b, 16c, 16d.

The parts rotatable about the bolt 385 are designated hereinafter as switches 391. The switch position according to Figs. 20, 20a in which the pin 390 bears against the upper side of the notch 389, corresponds to the position shown in Fig. 1. The coils of the solenoids 11a, 11b, 11c, 11d, are thereby pairwise connected in parallel by the small plates 18ab, 18cd. By connecting the conductors 13a, 13b, 13c, 13d from the changeover switch 46 to the contact members 219a, 219b, 219c, 219d, there are obtained connections similar to those of Fig. 1 by closing the connections at 14a, 14b, 14c, 14d. A connection of the solenoid coils with the bus-bar 219 corresponding to the bus-bar 40 in Fig. 1, is not present. In this position of the switch 391 and with the position of the lever 44 at addition as shown in Fig. 1, only the accumulators corresponding to the solenoids 11b, 11d can be selected, which, in this case, are intended for accumulating positive amounts. If for a similar position of the switch 391 the lever 44 is shifted to subtraction, then only the accumulators corresponding to solenoids 11a and 11c can be selected and are thus adapted for accumulating negative amounts. The selection of the accumulators is thus effected by closing contacts on the paper carriage or at the corresponding selector keys, and is operative when the main switch 24 is closed at the beginning of the machine operation.

If the switch 391 is rotated into its position of Figs. 21, 21a, in which the pin 390 bears against the lower edge of the notch 389, then the terminals 14a, 14b, 14c, 14d leave their positions of contact with the conductors 13a, 13b, 13c, 13d extending to the changeover switch 46. The terminals 16a, 16b, 16c, 16d now serve for bridging respective pairs of contact members 219a, 219b, 219c, 219d and the last members of the bus-bar 219, so that the connection of one pole of each solenoid coil with the bus-bar 219 is effected similarly to that of the conductor 40 in Fig. 1. The small plates 18ab, 18cd are now so positioned that the small plate 18ab only bears against a contact plate 17b, and the small plate 18cd against the contact plate 17d. The accumulators are therefore no longer connected in parallel in groups, but, like the other accumulators, have one pole bearing against the common bus-bar and can be selected only singly by the paper carriage or the selector key.

Obviously a plurality of switches 391 can be provided and also switches for separating in groups of three and more accumulators, of which, by means of a second switch mechanism, single accumulators or a plurality of accumulators may again be selected for determined purposes either automatically or manually.

When the machine is not required to be equipped with mechanism by means of which single accumulators or all accumulators can be selected groupwise for separating different kinds of calculation amounts, then the switch 391 is omitted and the contact members 219a, 219b, 219c, 219d are connected with the bus-bar by fixed or releasable connections. The machine in this manner can be equipped with such switch mechanism at any later time.

IX

SAFETY MEANS PREVENTING SIMULTANEOUS ACTUATION OF SELECTOR KEYS

Particularly in machines with a common tens carrying mechanism it is desirable to provide safety means for preventing simultaneous operation of two accumulators. If, for example, eighteen selector keys are present, corresponding to eighteen accumulators (Fig. 2) and the selector keys are disposed in two rows, then on depressing a key in one row, both the other keys in this row and also the keys in the second row must be locked against further depression of keys. The locking of the selector keys in the same row as a depressed key is effected in known manner by a so-called crowding lock in which a row of balls is arranged in such a manner that when they are spaced apart they give just sufficient passage as corresponds to the thickness of a key shank. The locking of the second row of keys takes place in the present constructional example by means of slides below the key shanks, by means of which also the contacts for the electric selection mechanism are closed. The mode of operation of the safety or locking means is as follows.

In Fig. 22, 400, 401 designate the lower ends of key shanks lying in two different rows. By means of these key shanks of selector keys, type bars are released in known manner, and by means not illustrated, which bars are used for printing a symbol corresponding to an accumulator. At right angles to and below the parts 400, 401 are mounted slides 402, 403 guided in an upper plate 404 and in a lower plate 405. At one side of each slide 402, 403 are arranged springs 409 (Fig. 24) which constantly urge the slides into the upper contact position. On the shaft 406 are attached levers 407 carrying a bar 408 which bar, on depression of the slide 402, is shifted laterally by a ramp 410 and is thereby brought below an extension 411 on the slide 403. Hereby on depression of a key shank 400 the actuation of all the selector keys in the opposite key row 401 is prevented. In similar manner upon depressing a selector key shank 401, the row of keys 400 is locked.

X

MEANS FOR RENDERING KEY SELECTION INOPERATIVE

The slides 402, 403 are provided at their lower ends with notches in which pins 412, 413 of levers 414, preferably of insulating material, engage, said levers being pivoted at 415, 416. One of these levers 414 is mounted below each selector key, which lever is connected by means of a metal strip 417 attached thereto, to a wire leading to a solenoid coil, not shown in Figs. 22–24, and co-operates by means of a screw 418 with a contact point 419, when a lever 414 moves downwardly upon actuation of a selector key. The contact points 419 are mounted on contact carriers 420, 421 which are hingedly mounted about rods 422, 423 (Fig. 23) and are pulled upwardly against a stop 426 by a common spring 424. From the contact carriers 420, 421 two leads 447 extend to a plate spring 427 having a contact 442.

A plate 425 is pivotable about an axis 428 (Figs. 23, 24) and can be depressed by pins 430, 431 against the resistance of an upwardly acting spring 429. The pins 430, 431 are mounted on a yoke 432, which upon rocking of the shaft 406 as a result of depressing a selector key in the left or right hand key row, is rocked correspondingly to the right or left. Hereby either the pin 431 or the pin 430 bears against the plate 425 forcing it away from the contact 439 which has connection over the conductor 39 with contacts 38 (Fig. 1).

Upon downward movement of the plate 425 the contact 442 is closed, effecting connection with the conductor 42 (Fig. 1).

The plate 425 corresponds to the current conveying portion of the switch 25 in Fig. 1. Upon operation of a selector key it is moved away from the contact 439 of the conductor 39 leading to the contact carriers 37. This is effected in the present case by rocking the shaft 406, the yoke 432, and depression of the plate 425 by means of the pins 430, 431. This permits current to flow from 425 over the contact 442 to the contact carrier 420 and from there over those contact points 419, which upon operation of one of the selector keys establish connection with the solenoid of the selected accumulator through the metal strip 418, 417 of the lever 414.

In the present example all contacts 419 are arranged on two contact carriers 420, 421 each having a lateral extension 433. These extensions 433 lie in front of ramps 434 of a latch 435 guided by means of two slots 436, 437 (Fig. 23) and having a notch 438. This notch 438 lies in the range of operation of a finger 440 of a safety lock 441. By means of a key the safety lock and the finger 440 can be rotated clockwise. When turned through 180° the finger will lie in the notch 438 of the latch 435 and will rock the lock member 443 in counter-clockwise direction against the action of a spring 444. Hereby a pin 445 of the latch 435 is released, which in Fig. 23 is shown as locked by one of the two stop shoulders of the slot 446 formed in the lock member 443, and actuates the latch 435 upon further rotation of the finger 440. In the lower end position of the latch 435 the finger 440 again releases the lock member 443 which responds to its spring 444 and causes the other stop shoulder in the slot 446 to lock the pin 445 against further movement. During movement of the latch 435, its ramps 434 press downwardly the projections 433 whereby the contact carriers 420, 421 are forced downwardly against the action of their springs 424. The magnitude of the downward movement of the contact carrier 420, 421 is so determined that upon depression of a selector key the screws 418 can no longer make contact with the contact points 419. By locking the latch 435 all the key contacts can be rendered inoperative and the accumulators can be selected only by the movement of the paper carriage. By turning the key in the safety lock 441 in the opposite direction, the key selection mechanism is again rendered operative.

The mechanism for disabling the selector keys can also be so arranged that the latch 435 has two notches 436, and the projections 433 on the contact carriers 420, 421 so staggered that they operate in succession. In this manner the left hand contact carrier 420, for example, may be rocked in the first rotation of the key, and the right hand contact carrier in a second rotation of the key. In this case, one-half of the selector keys, for example, would be rendered inoperative for accumulator selection by turning the key only once in the safety lock, while by a second rotation all the selector keys would be disabled. According to the invention, obviously individual contact points 419 and desired groups of contact points 419 could be rendered capable of disablement and locking, as already indicated in Fig. 1, for example, by changing from the first four contacts 2a to 2d.

I claim as my invention:

1. A calculating machine comprising a plurality of accumulators, a paper carriage, stops on the paper carriage, means for selecting said accumulators, a set of manually operable setting members, a set of setting members capable of being actuated by the stops, means connecting the selecting means and the stop actuatable setting members for controlling the selecting means in predetermined columnar positions of the paper carriage, means connecting the selecting means and the manually operable setting members for controlling the selecting means irrespective of the columnar position of the paper carriage, one of said connecting means being normally effective and the other ineffective, and a device controlled by the set of setting members the connecting means of which is normally ineffective for rendering the connecting means between the other set of setting members and the selecting means ineffective and rendering its own connecting means effective.

2. A calculating machine according to claim 1, in which the accumulator selecting means comprise solenoids each having a core, composed of a magnetic part and a non-magnetic part so combined that on energizing the solenoid the draw-in movement of the magnetic part is directly converted into an expulsion movement of the non-magnetic part, and in which a coupling pin and a spring are provided whereby the non-magnetic part actuates the coupling pin against the action of the spring.

3. A calculating machine according to claim 1, in which the accumulator selecting means comprise solenoids which constitute a closed removable unit contained in a coil supporting housing consisting of two side plates and distance pieces.

4. Calculating machine according to claim 1, in which both the said connecting means include circuits with conductors having magnets therein, said magnets being arranged in a common housing, and in which separate connection rings are provided, the ends of the conductors of the two sets of connecting means being attached to the said rings respectively and said rings being combined into a unit with the magnet housing.

5. Calculating machine according to claim 1, in which connecting means are provided between a plurality of the said accumulator selectors for simultaneously preselecting a plurality of accumulators by means of either of the said setting members, and in which a change-over means connected to the accumulator selectors which are subject of preselection is provided for further selecting certain of the preselected accumulators according to its position.

6. Calculating machine according to claim 1, in which connecting means are provided between a plurality of the said accumulator selectors for simultaneously preselecting a plurality of accumulators by means of either of the said setting members, a change-over means connected to the accumulator selectors which are subject of preselection being provided for further selecting certain of the preselected accumulators according to its position, and in which means are provided connected to the selectors and to the change-over means for rendering the said connecting means inoperative and for interrupting the connections between the selectors and the change-over means whereby the accumulators being subjects of preselection and further selection are made singly selectable only by the manually and carriage stop operated setting members.

7. A calculating machine comprising a plurality of accumulators, means for selecting the accumulators, a paper carriage, stops on the paper carriage, members intermediate the stops and the selecting means for controlling the latter, means actuated by the stops for making the members effective, a set of manually operable setting members, means connecting the selecting means and the setting members for controlling the selecting means, and a device controlled by the setting members for rendering the stop-actuated means ineffective.

HERMANN RAUH.